US009898695B2

(12) United States Patent
Suwald

(10) Patent No.: US 9,898,695 B2
(45) Date of Patent: Feb. 20, 2018

(54) SECURITY TOKEN AND AUTHENTICATION SYSTEM

(71) Applicant: NXP B.V., Eindhoven (NL)

(72) Inventor: Thomas Suwald, Hamburg (DE)

(73) Assignee: NXP B.V., Eindhoven (NL)

( * ) Notice: Subject to any disclaimer, the term of this patent is extended or adjusted under 35 U.S.C. 154(b) by 381 days.

(21) Appl. No.: 13/627,581

(22) Filed: Sep. 26, 2012

(65) Prior Publication Data

US 2013/0086389 A1    Apr. 4, 2013

(30) Foreign Application Priority Data

Sep. 30, 2011  (EP) .................................... 11183420
Nov. 11, 2011  (EP) .................................... 11188858
Feb. 14, 2012  (EP) .................................... 12155351

(51) Int. Cl.
    G06F 21/00        (2013.01)
    G06K 19/073       (2006.01)
    (Continued)

(52) U.S. Cl.
    CPC ... G06K 19/07354 (2013.01); G06F 3/04883 (2013.01); G06F 21/34 (2013.01);
    (Continued)

(58) Field of Classification Search
    None
    See application file for complete search history.

(56) References Cited

U.S. PATENT DOCUMENTS 4,845,347 A * 7/1989 McCrindle et al. .......... 235/380
4,899,036 A * 2/1990 McCrindle et al. .......... 235/380
(Continued)

FOREIGN PATENT DOCUMENTS

CA          156416 S        3/2015
CN        102035654 A       4/2011
(Continued)

OTHER PUBLICATIONS

Kui Yao, Nonlinear Dielectric thin films fo high power electric storage with energy density comparable with electrochemical supercapacitorsNonlinear Dielectric thin films fo high power electric storage with energy density comparable with electrochemical supercapacitors, Sep. 19, 2011, IEEE vol. 58, Issue 9.*

(Continued)

*Primary Examiner* — Dede Zecher
*Assistant Examiner* — Richard A McCoy

(57) ABSTRACT

Techniques are provided for entering a secret into a security token using an embedded tactile sensing user interface with the purpose of verifying the secret against a stored representation of the same secret. In particular, an embodiment of the security token according to the invention comprises a tactile sensing user interface being arranged to receive a user-encoded secret, a decoding unit being arranged to generate a decoded secret by decoding the user-encoded secret, a comparison unit being arranged to compare the decoded secret with a copy of the secret stored in the token in order to verify the authenticity of a user. Thereby, the security token provides on-card matching functionality.

25 Claims, 45 Drawing Sheets

(51) Int. Cl.

| | | |
|---|---|---|
| *G06F 21/34* | (2013.01) | |
| *G06F 21/35* | (2013.01) | |
| *G06F 21/36* | (2013.01) | |
| *G06F 21/77* | (2013.01) | |
| *G06F 21/83* | (2013.01) | |
| *G06Q 20/32* | (2012.01) | |
| *G06Q 20/34* | (2012.01) | |
| *G06Q 20/40* | (2012.01) | |
| *G07F 7/08* | (2006.01) | |
| *G07F 7/10* | (2006.01) | |
| *G06F 3/0488* | (2013.01) | |

(52) U.S. Cl.
CPC .............. *G06F 21/35* (2013.01); *G06F 21/36* (2013.01); *G06F 21/77* (2013.01); *G06F 21/83* (2013.01); *G06Q 20/32* (2013.01); *G06Q 20/341* (2013.01); *G06Q 20/352* (2013.01); *G06Q 20/4012* (2013.01); *G06Q 20/40145* (2013.01); *G07F 7/084* (2013.01); *G07F 7/0846* (2013.01); *G07F 7/0853* (2013.01); *G07F 7/1058* (2013.01)

(56) References Cited

U.S. PATENT DOCUMENTS

| | | | |
|---|---|---|---|
| 6,494,380 B2 * | 12/2002 | Jarosz | 235/487 |
| 6,630,752 B2 * | 10/2003 | Fleming et al. | 307/64 |
| 6,826,968 B2 * | 12/2004 | Manaresi et al. | 73/862.046 |
| 7,148,804 B2 * | 12/2006 | Salesky et al. | 340/572.4 |
| 7,366,466 B2 * | 4/2008 | Forster et al. | 455/41.2 |
| 7,395,972 B2 * | 7/2008 | Sickert et al. | 235/492 |
| 7,536,155 B2 * | 5/2009 | Forster et al. | 455/82 |
| 7,623,831 B2 * | 11/2009 | Forster et al. | 455/77 |
| 8,127,623 B2 * | 3/2012 | Son et al. | 73/862.046 |
| 8,164,407 B2 * | 4/2012 | Matsuda | 336/175 |
| 8,237,622 B2 * | 8/2012 | Furumura et al. | 343/895 |
| 8,393,229 B2 * | 3/2013 | Tao et al. | 73/862.046 |
| 8,477,029 B2 * | 7/2013 | Ashrafzadeh et al. | 340/540 |
| 8,621,245 B2 * | 12/2013 | Shearer et al. | 713/300 |
| D765,177 S | 8/2016 | Hewitt et al. | |
| 2003/0048005 A1 * | 3/2003 | Goldin et al. | 307/64 |
| 2006/0281435 A1 * | 12/2006 | Shearer et al. | 455/343.1 |
| 2006/0290469 A1 * | 12/2006 | Forster et al. | 340/5.61 |
| 2008/0148393 A1 | 6/2008 | Wendt | |
| 2008/0164978 A1 * | 7/2008 | Tanada | 340/10.1 |
| 2008/0169910 A1 * | 7/2008 | Greene et al. | 340/10.34 |
| 2008/0217414 A1 * | 9/2008 | Ito | 235/492 |
| 2009/0118848 A1 * | 5/2009 | Santinato et al. | 700/90 |
| 2009/0294339 A1 * | 12/2009 | Biewer et al. | 210/85 |
| 2009/0313693 A1 | 12/2009 | Rogers | |
| 2010/0031200 A1 | 2/2010 | Chen | |
| 2010/0039233 A1 * | 2/2010 | Niedzwiecki et al. | 340/10.1 |
| 2011/0020771 A1 * | 1/2011 | Rea et al. | 434/114 |
| 2011/0184824 A1 * | 7/2011 | George et al. | 705/24 |
| 2011/0252182 A1 * | 10/2011 | Harris | 711/101 |
| 2011/0279242 A1 * | 11/2011 | Krawczewicz | 340/10.6 |
| 2014/0330726 A1 | 11/2014 | Ball et al. | |

FOREIGN PATENT DOCUMENTS

| | | |
|---|---|---|
| CN | 102063599 A | 5/2011 |
| WO | 2005/043451 A2 | 5/2005 |
| WO | 2009/095263 A1 | 8/2009 |
| WO | 2015/131225 A1 | 9/2015 |

OTHER PUBLICATIONS

Extended European Search Report for Patent Appln. No. 12155351.5 (Feb. 13, 2013).

Finkenzeller, K., RFID Handbook, 3$^{rd}$ Edition, John Wiley and Sons, Ltd, West Sussex, UK, pp. 40-42 (2010).

* cited by examiner

IS 07816 + KEYPAD + DISPLAY

IS 07816 + BUTTON + DISPLAY

TOKEN ONLY + KEYPAD + DISPLAY

TOKEN ONLY + BUTTON + DISPLAY

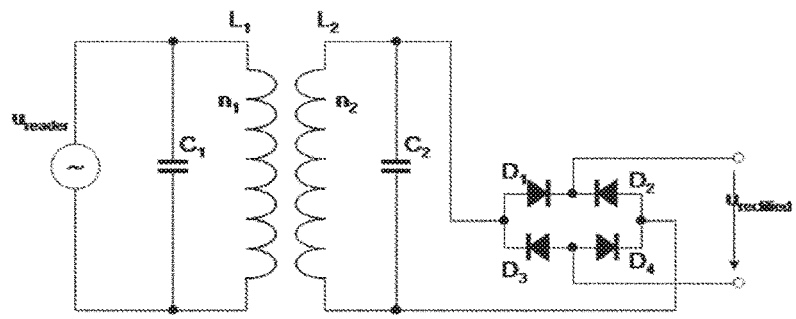
FIG. 6
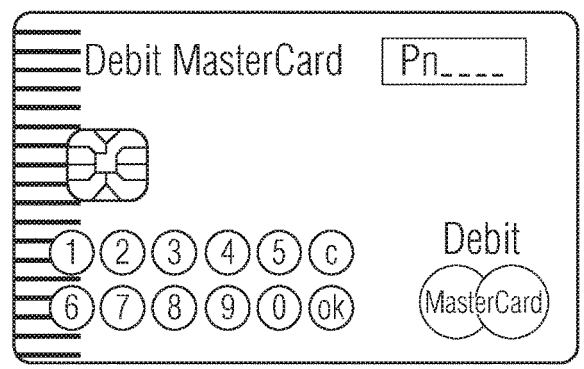
FIG. 7
大中　VII IX ข ญ アン
رو هيـ ك ل مـلاي 1?A
FIG. 8

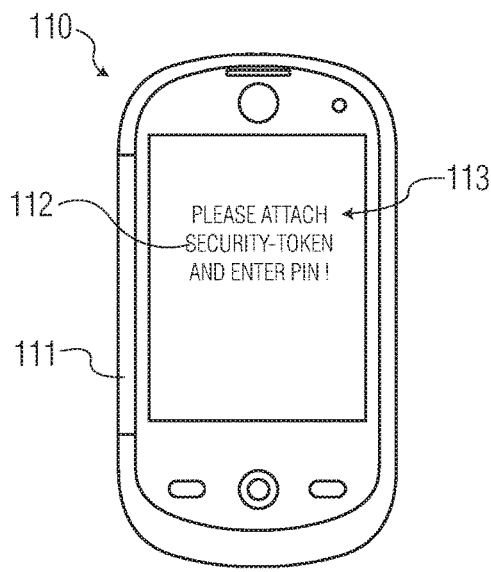
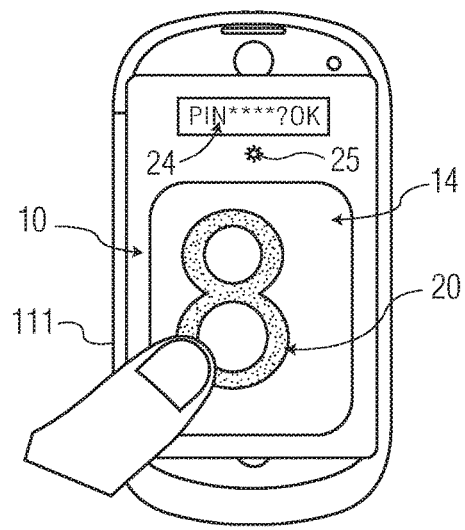
FIG. 62    FIG. 63
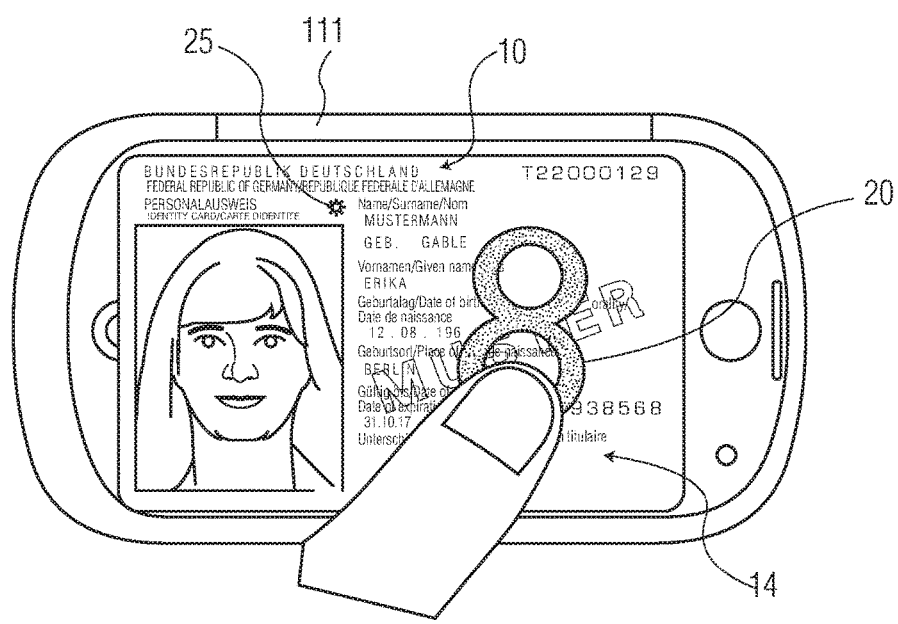
FIG. 64

SECURITY TOKEN AND AUTHENTICATION SYSTEM

CROSS-REFERENCE TO RELATED APPLICATIONS

This application claims the priority under 35 U.S.C. § 119 of European patent application no. 12155351.5, filed on Feb. 14, 2012, European patent application no. 11188858.2, filed on Nov. 11, 2011 and European patent application no. 11183420.6, filed on Sep. 30, 2011 the contents of which are incorporated by reference herein.

FIELD OF THE INVENTION

The invention relates to a security token. The invention also relates to an authentication system comprising an authentication server and a security token.

BACKGROUND OF THE INVENTION

Security tokens, such as Smartcards and electronic documents, which are employed in authentication applications typically require the entry of secure authentication code information. A standard solution in authentication is the entry of code information through a keypad integrated into a Smartcard reader, a Smartcard terminal or through a computer keyboard that is connected to a Smartcard reader. These setups have the disadvantage that man-in-the-middle-attacks can compromise the secure code information transfer between the Smartcard and the host system in unencrypted formats.

Reports on these attacks are regularly published on the internet or through the media. End-users are scared about these attacks and as a consequence the acceptance of Smartcards in security relevant authentication applications, such as online payments or online applications based on electronic identity cards, decreases significantly. Security problems related to authentication through a Smartphone are even of greater public concern. Online payment transactions executed through a Smartphone are less secure than if they would be executed through a laptop or a PC, because security features like firewalls and virus scanners are still uncommon for Smartphones. Bluetooth pairing enables unwanted access by third parties to the Smartphone and attackers may install key logging applications or malware targeting at code spoofing.

To cope with this kind of security problems in online transactions Smartcards have been disclosed that comprise a numerical key pad for authentication code information entry, but these solutions lack interactivity. Online authentication using a contact or contact-less communication interface is not provided. These solutions are either ISO7816 contact-based or battery-operated stand-alone devices without a communication link that is required for seamless integration into web-based applications. A key-pad for code entry cannot be used if the token is attached to a contact reader. Direct match of authentication data on a Smartcard (match-on-card) is currently not feasible in online mode. All battery-powered solutions disclosed so far hardly meet the product quality and lifetime requirements of the aforementioned applications.

The available surface area for key-pad integration is very limited on a Smartcard resulting in unacceptable small key sizes. Especially elder people or people with visual or motoric impairments face problems with too small key pads. Also for other people authentication information entry on tiny key pads causes errors due to finger or stylus misalignment.

Authentication is the process of determining whether someone or something is, in fact, who or what it is declared to be. In private and public computer networks (including the Internet), authentication is commonly done through the use of logon passwords. Knowledge of the password is assumed to guarantee that the user is authentic. Each user registers initially (or is registered by someone else) using an assigned or self-declared password. On each subsequent use, the user must know and use the previously declared password. This system is too weak for important transactions (such as the exchange of money) in that these passwords can often be stolen, accidentally revealed or forgotten. For this reason, Internet business transactions and many other transactions require a more stringent authentication process. Therefore, there exists a need for secure authentication through a contact-less token device comprising tactile pattern entry directly on a document's surface.

FIG. 1 is a detailed view of a prior art electronic paper display module. The display component is one of the most expensive components in current display-based authentication cards. The cost is mainly determined by the display driver function. The cost is further increased by the means necessary for integrating the display in the cards. Also, the substrate material for front and rear substrate represents a cost factor. The active display material is normally applied in very thin layers of 30-80 µm and is relatively inexpensive.

The displays currently used in display-based cards are either LCDs or electrophoretic displays; in rare cases electrochromic displays are used. Typically, displays of prior art token cards are of the segmented type (FIG. 1, FIG. 2), which means that they have single digits composed from 7 to 14 segments (FIG. 3). FIG. 2 is another detailed view of a prior art electronic paper display module. Also, FIG. 3 is an illustration of prior art segmented displays.

The visual impression of a character is better if it constructed from more segments. However, more segments also require more control signals which directly relates to the chip-size of driver components. In current chip design a certain minimum pitch between neighboring pads has to be implemented. This pitch is related to the assembly accuracy, which is related to units per hour (UPM) of component placements. A better UPM requires a larger pitch. A 14-segment display with a nice resolution will result in extremely high cost, especially when the display technology does not allow passive segment multiplexing as is the case with LCD, electrophoretic and electrochromic displays. Therefore, better approaches are required to reduce the display pin count.

With respect to power requirements, the electrophoretic displays seem to be of advantage if just the display power consumption is considered. The disadvantage of an electrophoretic display is its high voltage requirement. Actual E-Ink displays require voltages between 7V and 15V. If these voltages have to be generated from logic level that may be 2.5V, a multi-step charge pump needs to be involved. The charge pump has the disadvantage of area consumption for its capacitors and next to that quite a low efficiency, especially at low driving voltages. OLED displays require voltages in the range of 3.5V to 7V, which may also require a charge pump.

Some display materials provide bi-stability, which means that the display content is maintained without power supply for a long time. Electrophoretic displays are frequently used for token cards due to the low power consumption for display retention and also due to the long-term display bi-stability. Bi-stability of electrochromic displays depends on the material definition and ranges from minutes to days.

Current display cards utilize pre-manufactured display modules that are integrated during card assembly. The background is a virtual fence between the display provider and the document manufacturer. The display manufacturer produces a multipurpose display while the document manufacturer has limited specification requirements. Nevertheless the volume for specific displays is still too low for a separate display design. That is one of the reasons while still generic display modules are integrated into electronic documents. The available display modules are still too thick and moreover use their own substrate. During card integration a special compensation layer is required in the document construction to compensate the display topology. The display thickness of E-Ink displays is ~300 μm, of LCD displays it is ~400 μm.

FIG. 4 is an illustration of a prior art display assembly. The token body is fabricated from four substrate layers 11, 12, 15, 17. The pre-manufactured display 14a is assembled to the substrate 12 comprising the antenna 13. A compensation layer 15 comprising a cut-out 16 that compensates the topology of the display 14 is assembled on top of layer 12. A transparent layer 17 comprising an unprinted window area 18 is assembled on top of layer 15. Finally a transparent layer 11 with inside print forms the backside of the token and is assembled below layer 12. The assembled layers are laminated applying temperature and pressure for a defined time, resulting in the token body 21 with the visible display beneath window 19. This assembly approach requires a preassembled display module, display placement and attachment and an additional substrate layer with a cut-out to compensate the display's topology.

FIG. 5 is a collection of detailed views of prior art interactive authentication cards. Prior art security token cards with a simplified user interface (UI) have been disclosed for banking applications. These cards are used for the generation of one time passwords (OTP) based on a personal identification number (PIN). Different UI-layouts are required to fulfill the different needs. In the examples shown in FIG. 5 twelve button-keypads are used for PIN-entry or single buttons for PIN-independent OTP-generation. Each of these product configurations currently requires one hardware design resulting in initial design cost as well as cost of ownership.

The display cards shown in FIG. 5 are powered by integrated batteries. The batteries used in security tokens of the kind set forth have three main problems that make them incompatible with tokens for long-life documents, such as electronic identity cards:

The battery drains even if the device is not operated. The maximum operational lifetime is 3 years under low-temperature storage condition.

The batteries have a thickness of 450 μm and are difficult to integrate into electronic documents, especially into multifunctional cards. The height of 450 μm is not compatible with the height of display modules; hence an additional compensation layer is required to compensate the batteries topology.

The batteries introduce reliability problems because their outside material is not compatible with the materials used for documents in terms of mechanical and thermal properties. As a consequence, delamination occurs under mechanical stress.

No authentication cards with user interfaces have been disclosed that are functional in contact-less mode. However, powering an ordinary Smartcard from the field is a common approach. Standard handbooks on Smartcards (for example "RFID Handbook: Fundamentals and Applications in Contactless Smart Cards, Radio Frequency Identification and Near-Field Communication", Third Edition, by Klaus Finkenzeller, August 2010) teach to use a loop antenna with 6-7 turns. A standard reader providing field strengths between 1.5 and 7.5 A/m will not be able to supply a multifunctional card with the required power of up to 40 mW through that standard loop antenna.

FIG. 6 is a schematic of a prior art contact-less power supply. According to FIG. 6 the power supply provides a maximum voltage $u_{rectified}$ to a subsequent Smartcard system at resonance of one of the sidebands of the modulated carrier. Based on compatibility requirements with old fashioned Smartcard ICs supply voltages of up to 5V need to be provided. Single functions Smartcards (no display, no input interface, and no advanced cryptographic functionality) have decent power consumption. Due the standardized applications a Smartcard must still receive sufficient supply voltage, even when the card is positioned at a certain distance away from the reader and if more than one Smartcard is within reach of the same reader. The Smartcard's antenna inductance L2 forms together with the capacitor C2 a resonator circuit with a quality factor high enough to achieve voltage increase by resonance. This voltage increase is required to provide sufficient voltage to standard cards.

FIG. 7 is a detailed view of a prior art interactive authentication card. Typically, interactive Smartcards used for authentication purposes provide a key pad interface for PIN-code entry. These key pad solutions have the following disadvantages:

The buttons are extremely tiny and difficult to use, especially by users with visual or motoric impairments like elder users. Also under certain use cases like emergency like situations operation of such a card is challenging.

The code space is limited to the numbers 0-9.

Anybody with access to the authentication information can use the card.

It is impossible to change the code space.

Tactile pattern recognition methods have mainly been disclosed for personal digital assistants (PDA) and the latest Smartphone generations. Known character recognition systems for online handwriting recognition (OHR) are based on feature extraction, classification and selection. A standard implementation thereof comprises Hidden Markov Models. All these approaches target a good writer-independent recognition performance by identifying similarity patterns within tactile patterns of the same meaning.

The tactile pattern recognition recognizes a tactile pattern and assigns a predefined meaning to it, for example a digit. A combination of multiple tactile patterns is translated into a secret represented by a sequence of related meanings, for example a sequence of digits. The resulting feature extractors are configured to neglect all differences between tactile patterns with the same meaning. High recognition performance translates into elimination of all writer-dependent characteristics. This recognition process consumes a lot of computational resources resulting in high power requirements for the recognition system.

The implementation of a Hidden Markov Model on a Smartcard would consume too much energy due to the required calculations. Still, the disclosed OHR approaches are designed to achieve good recognition performance despite user variation. Quite often standard handwriting databases are applied ("CASIA Handwriting Database", "Online Western Handwritting Unipen Database", "NIST Handprinted Forms and Characters Database") to benchmark the recognition performance. When successfully benchmarked, the recognition algorithm has completely removed a writer-dependent characteristic, which is not at all desired for an authentication system. In other words, for an authentication system it would be desirable to maintain these writer-dependent characteristics.

FIG. 8 is an illustration of international character samples. Prior art gesture recognition systems utilize feature-based recognition approaches. These approaches require complex local character feature definitions if user interfaces are to be adapted to another foreign character set. Feature extraction for local character sets as shown in FIG. 8 can be an effort-consuming process. Even after adoption to local character sets users with a different local background, like immigrants or guest workers, may not be able to enter characters in a recognizable format. The same applies to people with motoric impairments that have to write characters in a complete different style. For many applications, especially online applications, a fast localization is a key requirement and no user group must be excluded. Prior art recognition systems do not allow an interactive user-related feature definition.

The code space in prior art authentication applications for Smartcards is restricted to $10^n$ numbers in case of PIN-code entries with n being the number of digits assembling the PIN. Full alphanumerical support is currently not provided for token-based solutions as prior art tokens lack the space to implement an alphanumeric keypad.

FIG. 9 is a detailed view of a prior art secure contact-less reader with an authentication interface. Such a reader may be configured to receive an electronic identity card. On an electronic identity card of this kind authentication code information may have to be entered through a secure (but expensive) reader device as depicted in FIG. 9. If a PC or Laptop is used to enter authentication information unauthorized access i.e. by key-loggers becomes feasible. Other attacks make use of the browser plug-in communicating with the Smartcard through the reader-DLL in order to get access to the PIN-code stored on the Smartcard.

Prior art authentication cards are not able to connect during the entry of authentication information to a remote service. Especially for web-based applications it is a key requirement that a security token seamlessly integrates into the communication chain from the web application to the token and vice versa.

Currently, contact-less communication according to ISO14443 is well introduced for electronic documents. Due to the nature of magnetic coupling communication through the contact-less interface may be easily intercepted by unauthorized thirds. Electronic documents are optimized for improved reading distance in order to support ease of use i.e. in border control applications. Border control is a minor application related to the expected use of electronic documents for authentication in online transactions. In online transaction applications the card is with close to 100% probability directly attached to a contact-less Smartcard reader and extended read range is not required and, in case of authentication, not wanted.

FIG. 10 is an illustration of the prior art available interface area in communication mode. Disclosed token cards are mainly banking cards (see FIG. 5 and FIG. 7) based on ISO7816 contact based interfaces. The user interfaces of the known token cards are conflicting with other component placements. If a contact-based card is attached to a contact reader, a big portion of the card disappears in the reader (shaded overlay area in FIG. 10), leaving a very small surface area for any form of interactivity. Typically, banking cards do not support any interactive mode while attached to a reader. In view thereof online authentication is not feasible.

Typically, security tokens have a user interface with extremely tiny buttons (see FIG. 7 and FIG. 10). The button size is restricted such that buttons must not interfere with the antenna, a potential embossing area and a potential magnet stripe. Document owners with visual or motoric impairments are unable to operate the device. Especially elder persons have difficulties with this sort of interface. The exclusion of such a large user group is not acceptable.

FIG. 11 is an illustration of blocking areas for interactive sensors in prior art authentication cards. Prior art token cards have tight restrictions for input element placements. Button areas are normally kept separately from necessary card information areas. They must also not interfere with the cards corporate ID elements. As a consequence, the resulting button areas are extremely small. The illustration in FIG. 11 indicates blocking areas 61-65 of battery-powered token cards. The following components define the key area restrictions: battery 62, contact mode interface (ISO7816) 61, display module 63 and Corporate Identity elements 64-65.

Prior art security tokens are relatively costly due over-specification, especially in the display interface. Furthermore, none of these security tokens comply with basic authentication requirements, such as a lifetime of at least 10 years, an interactive mode, NFC compatibility and on-card matching functionality.

SUMMARY OF THE INVENTION

It is an object of the invention to improve security tokens of the kind set forth. This is achieved by a security token as defined by claim 1.

According to aspects of the invention, techniques are provided for entering a secret into a security token using an embedded tactile sensing user interface (UI) with the purpose of verifying the secret against a stored representation of the same secret. In particular, an embodiment of the security token according to the invention comprises a tactile sensing user interface being arranged to receive a user-encoded secret, a decoding unit being arranged to generate a decoded secret by decoding the user-encoded secret, a comparison unit being arranged to compare the decoded secret with a copy of the secret stored in the token in order to verify the authenticity of a user. Thereby, the security token provides on-card matching functionality.

According to a further embodiment of the invention, the tactile sensing user interface is arranged to capture tactile patterns and to provide a tactile pattern data stream which represents the user-encoded secret and which comprises a sequence of said tactile patterns to the decoding unit, the decoding unit is arranged to generate the decoded secret by applying a private inverse transfer function to the tactile pattern data stream, and the private inverse transfer function is the inverse of a private transfer function applied by the user to encode the secret. Thereby, the entropy of the user-encoded secret is increased, which adds security to the entry of the secret.

According to a further embodiment of the invention, the private inverse transfer function is definable by the user via the tactile sensing user interface in a configuration mode of the token. Thereby, the code space of tactile patterns that can be used to encode secrets becomes relatively large, in particular in case of a large user group.

According to a further embodiment of the invention, the private inverse transfer function further reflects user-specific tactile pattern deviations captured by the tactile sensing user interface in the configuration mode of the token, such that the entropy of the user-encoded secret is increased. Thus, the entropy of the user-encoded secret is further increased.

According to a further embodiment of the invention, the private inverse transfer function further reflects sensor-device-specific tactile pattern deviations applied by the tactile sensing user interface in the configuration mode of the token, such that the entropy of the user-encoded secret is increased. Thus, the entropy of the user-encoded secret is further increased.

According to a further embodiment of the invention, the token further comprises a release foil with printed tactile key information for defining the private inverse transfer function. Thereby, it is made easier to unlock the token for enabling the user to define the private inverse transfer function in the configuration mode of the token.

According to a further embodiment of the invention, the tactile sensing user interface comprises an array of proximity sensors or mechanical pressure sensors. Proximity sensors and mechanical pressure sensors can be implemented relatively easy in a token of the kind set forth.

According to a further embodiment of the invention, the tactile sensing user interface comprises a mesh network of proximity sensing capacitors. Thereby, the number of I/O lines of the tactile sensing user interface is reduced.

According to a further embodiment of the invention, the proximity sensors comprise proximity sensing capacitors. Proximity sensing capacitors are particularly suitable for integration in a token of the kind set forth.

According to a further embodiment of the invention, the token further comprises a compressible layer on which the array of proximity sensing capacitors is mounted and counter-electrodes underneath the compressible layer, said counter-electrodes forming pressure-dependent capacitances in conjunction with the proximity sensing capacitors. Thereby, more pressure information is added to the user-encoded secret.

According to a further embodiment of the invention, the token further comprises button functions assigned to sub-areas of an area covered by the array of proximity sensors or mechanical pressure sensors, and the token further comprises a surface print design which provides a visual overview of said button functions. Thereby, product configuration by a document manufacturer is enabled.

According to a further embodiment of the invention, the user-encoded secret comprises a personal identification number and the private inverse transfer function translates elements of a user-defined character repertoire to digits of the personal identification number, and the user-defined character repertoire comprises at least one of the group of: alphanumeric character tactile patterns corresponding to said digits, key position tactile patterns corresponding to said digits, graphical symbol tactile patterns corresponding to said digits. Personal identification numbers are widely used to authenticate users.

According to a further embodiment of the invention, the user-encoded secret comprises a signature short-cut and the private inverse transfer function decodes a tactile pattern which represents said signature short-cut. Thereby, a user-friendly authentication method is realized.

According to a further embodiment of the invention, the token further comprises at least one of the group of: a feedback indicator, a status indicator, a display, an audio output. The feedback indicator, status indicator and display may provide visual feedback to the user. The audio output may provide audible output to the user which is useful if the user is visually impaired, for example.

According to a further embodiment of the invention, the token further comprises a display, the display comprising at least one of the group of: icons, segments, active areas that have been structured by a printed shadow mask. In particular iconized displays are relatively cheap and power-efficient.

According to a further embodiment of the invention, the token further comprises a backchannel implemented by a program element, such as a Java-applet, for communicating with a host system such that the token may use a display of the host system as a virtual display. Thereby, there is no need for a display on the token and the cost of the token may be reduced.

According to a further embodiment of the invention, the token is arranged to receive power for operating the tactile sensing user interface, the decoding unit and the comparison unit from an external electromagnetic field. Thereby, there is no need for a battery integrated on the token and, as a consequence, the lifetime of the token may be increased and the cost of the token may be reduced.

According to a further embodiment of the invention, the token further comprises a radio frequency identification (RFID) interface being arranged to enable communication with RFID devices and NFC-enabled devices and being arranged to receive power from an electromagnetic field generated by said RFID devices and NFC-enabled devices. Thereby, the token has an increased range of use. For example, the token may act as a security extension for an NFC-enabled Smartphone.

According to a further embodiment of the invention, the token further comprises a power unit being arranged to power the token from an external electromagnetic field, and the power unit comprises one or more super capacitors for buffering energy, said super capacitors consisting of electrochemical double-layer capacitors with an energy density substantially greater than the energy density of conventional electrolytic capacitors, in particular hundreds of times greater than the energy density of conventional electrolytic capacitors. Thereby, the power unit may buffer energy for performing relatively complex functions.

According to a further embodiment of the invention, the token further comprises a tapped antenna structure or an antenna with at most three turns in order to maximize the efficiency of power coupling to the token. By increasing the efficiency of power coupling to the token complex operations are enabled.

According to a further embodiment of the invention, the token further comprises an optical communication interface which is arranged to establish a secure backchannel, said optical communication interface being embedded into the body of the token. Thereby, encrypted private information may be transmitted securely.

According to a further embodiment of the invention, the surface of the token is overlaid by the tactile sensing user interface such that tactile patterns entered by a user are sensed through said surface. Thereby, the token may be manufactured at high volumes with a relatively low cost.

According to a further embodiment of the invention, the tactile sensing user interface comprises a key-pad layout. A key-pad layout is useful for interactive access cards.

According to a further embodiment of the invention, the token is an electronic identification card or an electronic passport. The token according to the invention is particularly suitable as an electronic identification card or an electronic passport since the on-card matching functionality enables a very secure authentication process.

According to a further embodiment of the invention, the token has a portrait form factor. Thereby, a relatively large tactile sensing area may be offered.

According to a further embodiment of the invention, an authentication system is provided which comprises an authentication server and a security token of the kind set forth, wherein the security token is further arranged to send a verification result to the authentication server.

According to an alternative embodiment of the invention, an authentication system comprising an authentication server and a security token is provided, wherein the security token comprises a tactile sensing user interface being arranged to receive a user-encoded secret; a decoding unit being arranged to generate a decoded secret by decoding the user-encoded secret; an encryption unit being arranged to encrypt the decoded secret in order to generate an encrypted decoded secret; wherein the security token is further arranged to send the encrypted decoded secret to the authentication server; wherein the authentication server comprises: a decryption unit being arranged to decrypt the encrypted decoded secret; a comparison unit being arranged to compare the decoded secret with a copy of the secret stored in the authentication server in order to verify the authenticity of a user. Thereby, a copy of the secret need not be stored in the security token which may offer additional security.

According to a further embodiment of the invention, said authentication system forms part of at least one of the group of: a governmental service, a web shop service, an online auction service, an online gaming service, an online banking service, an online media service, an online airline service, a car access system, a door lock system, an in-flight payment service, a flight attendant panel, a mobile phone based identification system, a mobile phone based payment system, a software license control system.

BRIEF DESCRIPTION OF THE DRAWINGS

The invention will be described in more detail with reference to the appended drawings, in which:

FIG. 6 is a schematic of a prior art contact-less power supply;

FIG. 7 is a detailed view of a prior art interactive authentication card;

FIG. 8 is an illustration of international character samples;

FIG. 62 is a detailed front view of a Smartphone;

FIG. 63 is an illustration of the Smartphone of FIG. 62 performing authentication for an online transaction comprising a security token with tactile sensor interface according to an embodiment of the invention;

FIG. 64 is an illustration of the Smartphone similar to FIG. 63 performing authentication for an online transaction comprising an electronic ID card with a tactile sensor interface according to an embodiment of the invention;

DESCRIPTION OF EMBODIMENTS

Exemplary embodiments of the present invention will be described below. In an effort to provide a concise description of these exemplary embodiments, implementation details which fall into the customary practice of the skilled person may not have been described. It should be appreciated that in the development of any such implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill.

According to aspects of the invention, techniques are provided for entering a secret into a security token using an embedded tactile sensing user interface (UI) with the purpose of verifying the secret against a stored representation of the same secret. A tactile sensing interface like an array of proximity sensing capacitors may be used to detect tactile patterns and provide a tactile pattern data stream to the electronic device. The electronic device may reassemble a secret from the sensed tactile pattern data. In order to improve security during the entry of the secret said secret is transferred by the user into the extremely large code space of all known tactile patterns by applying a private (secret) transfer function. Reassembling the secret from entered tactile patterns requires application of an inverse transfer function.

Figure 12:
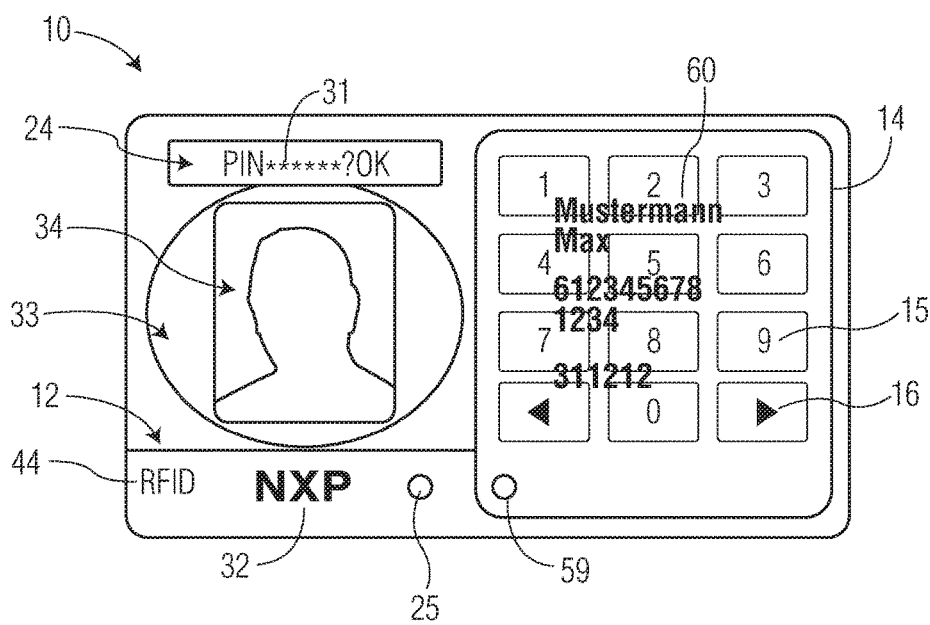
FIG. 12 is a detailed front view of a security token in accordance with an embodiment of the invention.

FIG. 12 is a detailed front view of a security token 10 in accordance with an embodiment of the invention. In particular, it illustrates a token 10 which uses the techniques for tactile pattern association according to the invention. The implementation of the tactile pattern association will be described below with reference to the illustrated electronic device 10, which may be an electronic identification card, an electronic online payment card, an electronic banking card, an electronic credit card, an electronic access card, an electronic passport, an electronic drivers license, an electronic money card, an electronic health card, an electronic loyalty card, an electronic door entrance card or any combination thereof. It should be noted that the techniques described herein are usable with any contact-less Smartcard device configured to receive input through a tactile sensing interface.

As illustrated in FIG. 12, the electronic device 10 may be a security token powered by an electromagnetic field and incorporating the functionality of one or more Smartcard devices, such as an electronic identification card, an electronic online payment card, an electronic banking card, and so forth. Depending on the functionalities provided by the electronic device 10, a user may authorize governmental services, authorize online transactions, authorize cash out payments, authorize access to locations, authorize access to a machine, authorize access to a device, and authorize access to a vehicle.

Figure 50:
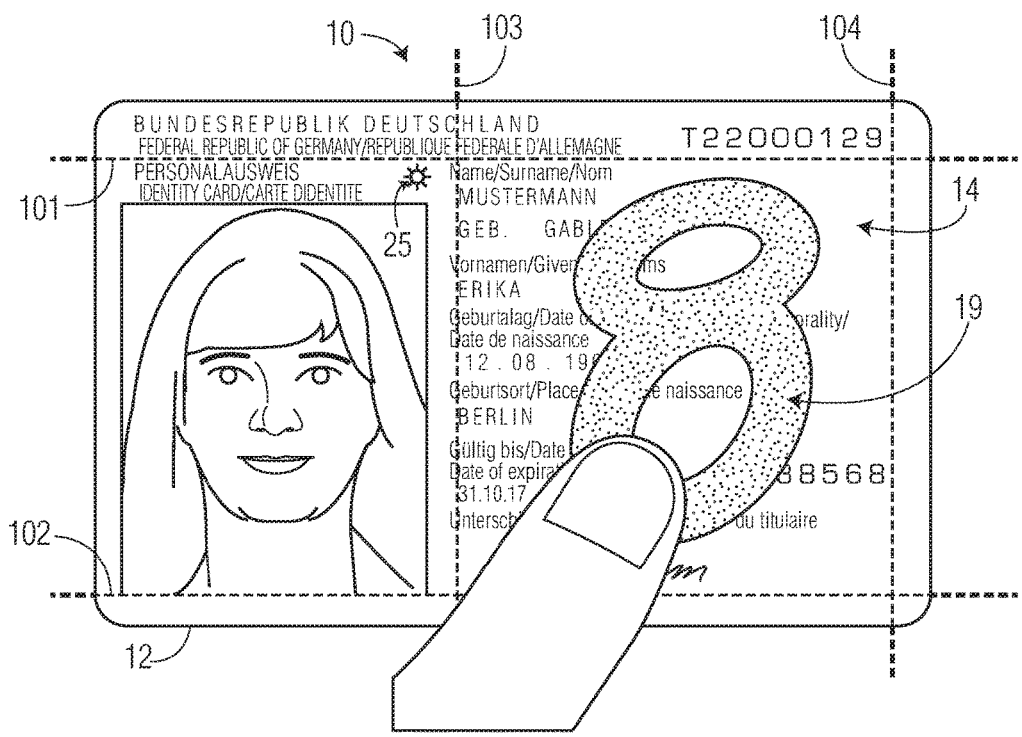
FIG. 50 is a detailed front view in accordance with another embodiment wherein the secret comprises a personal identification number that comprises a sequence of numerical tactile patterns and wherein the tactile sensing interface is integrated into an electronic ID card and wherein status information guiding the user entry process is indicated by an optical element embedded into the document body.

The electronic device 10 also may communicate with other devices using short-range connections, such as contact-less communication according to ISO14443 or near field communication (NFC). By way of example, the electronic device 10 may be a model of a German Identification Card as illustrated by FIG. 50, available from Bundesdruckerei, Berlin.

According to the depicted embodiment, the token 10 includes a body 12 that embeds and protects the interior components from physical damage. The body 12 may be formed from any suitable material such as plastic, card board, paper, or a composite material and may allow certain frequencies of electromagnetic radiation to pass through to the contact-less communication circuitry within the token 10 to facilitate contact-less communication or to pass through to the optical communication circuitry within the token 10 to facilitate optical communication.

Figure 13:
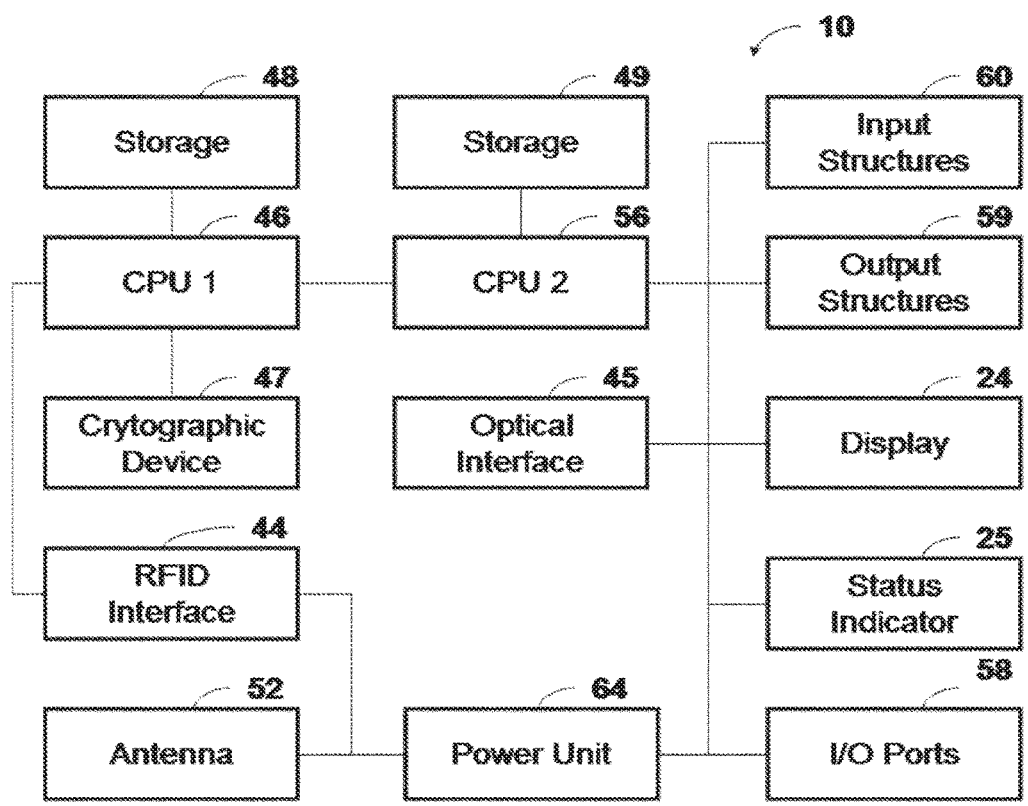
FIG. 13 is a first simplified block diagram of the device of FIG. 12 in accordance with an embodiment of the invention.

FIG. 13 is a first simplified block diagram of the device of FIG. 12 in accordance with an embodiment of the invention. Additional details of the illustrative token 10 will be explained with reference to FIG. 13, which is a block diagram illustrating various components and features of the token 10 in accordance with an embodiment of the present invention. The block diagram includes the display 24 and the status indicator 25 and the output structures 59 and the RFID interface 44 discussed above, as well as many other components.

The operation of the token 10 may be controlled by a first central processing unit (CPU) 46 that provides the processing capability required to execute a task scheduler, a JAVA virtual machine, programs, and any other functions of the token 10. The first CPU 46 may include a single processor or it may include a plurality of processors. For example, the first CPU 46 may include "general purpose" microprocessors, a combination of general and special purpose microprocessors, instruction set processors, and/or related chips sets, and/or special purpose microprocessors. The first CPU 46 also may include on-board memory for caching purposes.

Information used by the first CPU 46 may be located within long-term storage 48. The long-term storage 48 of token 10 may be used for storing data required for the operation of the first CPU 46 as well as other data required by the token 10. For example, the storage 48 may store a first firmware for the token 10 that is used by the first CPU 46. The first firmware may include a task scheduler, as well as other programs that enable various functions of the token 10, UI functions, and/or processor functions. The storage 48 also may store components, such as secrets, reference tactile pattern data, and decision trees. Additionally, the long term storage 48 may store data files such as media (for example audio speech samples), cryptographic keys and signatures, and any other suitable data. The long term storage 48 may be a non-volatile memory such as read-only memory, flash memory, or any other suitable optical, magnetic, or solid-state computer readable media, as well as a combination thereof.

The input structures 60 are configured to receive input from a user's or object's tactile pattern and to send the information to the second CPU 56, which interprets the tactile pattern and performs a corresponding action. The input structures 60 may employ any suitable type of tactile pattern sensor technology such as resistive, capacitive, infrared, surface acoustic wave, electromagnetic, or near field imaging. The input structures 60 may be configured to sense mechanical pressure applied to the surface of a sensor.

The second CPU 56 may provide the infrastructure for exchanging data between the first CPU 46 and input/output devices, such as the input structures 60 and the display 24. The second CPU 56 may contain one or more integrated circuits and may be integrated with the CPU 46 or exist as a separate component. The second CPU 56 also may provide the infrastructure for communicating with external devices through the I/O ports 58. The I/O ports 58 may include I/O ports for connecting the CPU 56 to an external computer, I/O ports implementing a JTAG debugging interface, an ISO7816 compatible serial interface, an I2C-bus interface, or the like.

Information used by the second CPU 56 may be located within long-term storage 49. The long-term storage 49 of token 10 may be used for storing data required for the operation of the second CPU 56 as well as other data required by the token 10. For example, the storage 49 may store a second firmware for the token 10 that is used by the second CPU 56. The firmware may include a task scheduler, as well as other programs that enable various functions of the token 10, UI functions, and/or processor functions. The storage 49 also may store components, such as reference tactile pattern data, and decision trees. Additionally, the long term storage 49 may store data files such as media (e.g., audio speech samples), and any other suitable data. The long term storage 49 may be a non-volatile memory such as read-only memory, flash memory, or any other suitable optical, magnetic, or solid-state computer readable media, as well as a combination thereof.

According to an exemplary embodiment of the invention, the first CPU 46 may control the operation of the token 10 and the second CPU 56 may comprise the decoding unit for generating the decoded secret. The first CPU 46 may compare the decoded secret with the copy of the secret stored in the token.

Figure 1:
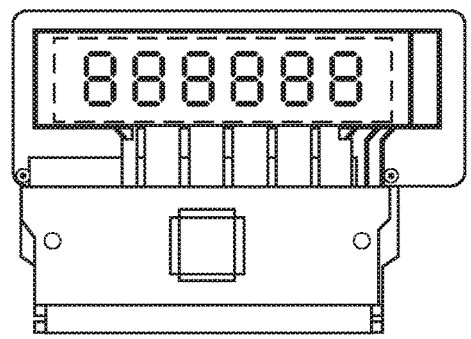
FIG. 1 is a detailed view of a prior art electronic paper display module.
Figure 2:
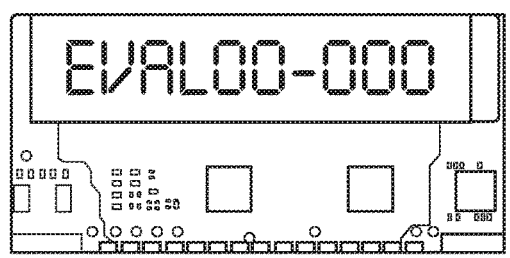
FIG. 2 is another detailed view of a prior art electronic paper display module.
Figure 3:
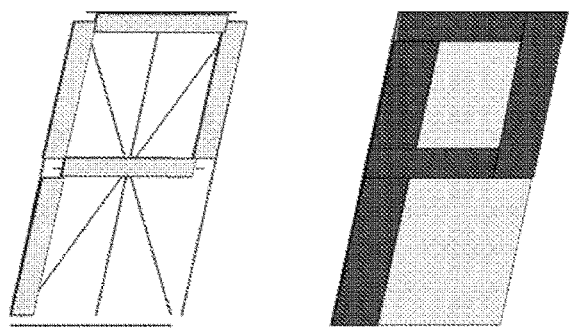
FIG. 3 is an illustration of prior art segmented displays.
Figure 4:
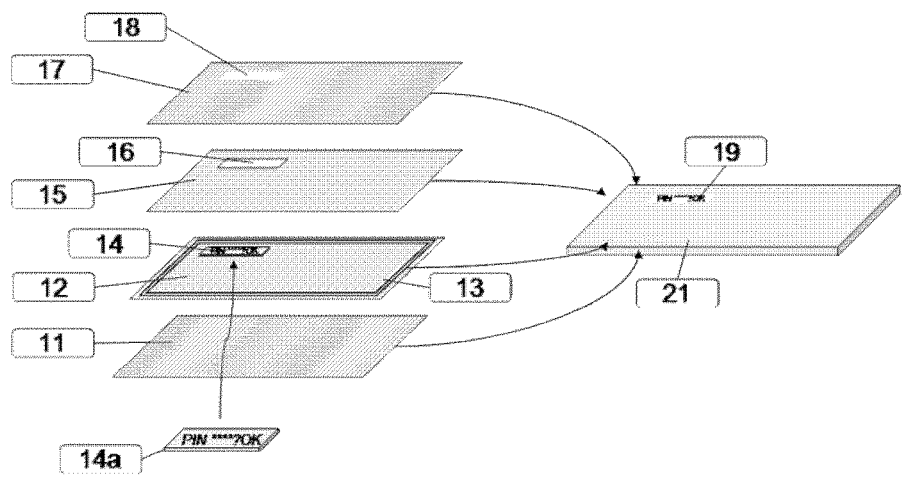
FIG. 4 is an illustration of a prior art display assembly.
Figure 5:
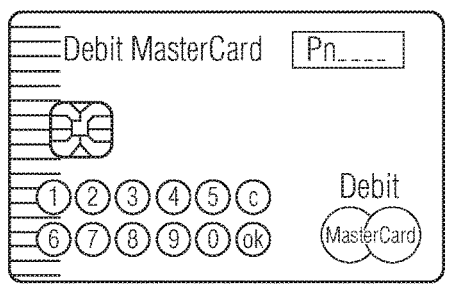
FIG. 5 is a collection of detailed views of prior art interactive authentication cards.
Figure 5:
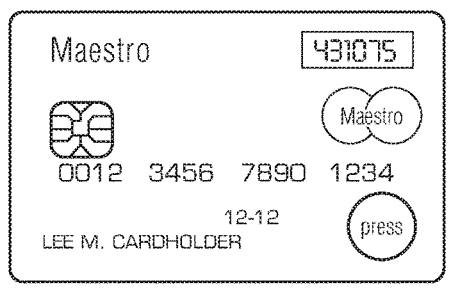
Figure 5:
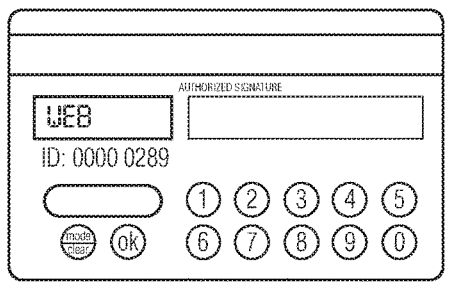
Figure 5:
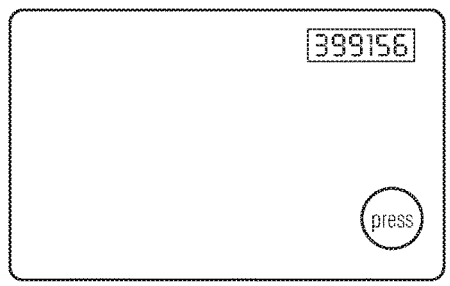
Figure 9:
FIG. 9 is a detailed view of a prior art secure contact-less reader with an authentication interface.
Figure 10:
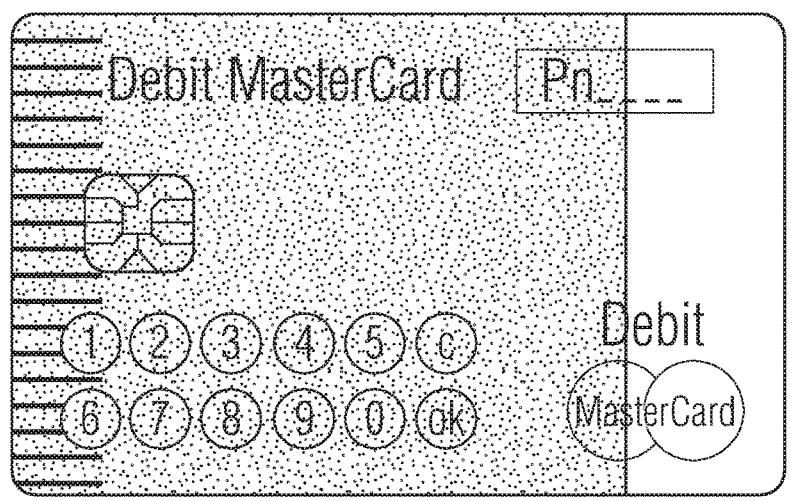
FIG. 10 is an illustration of the prior art available interface area in communication mode.
Figure 11:
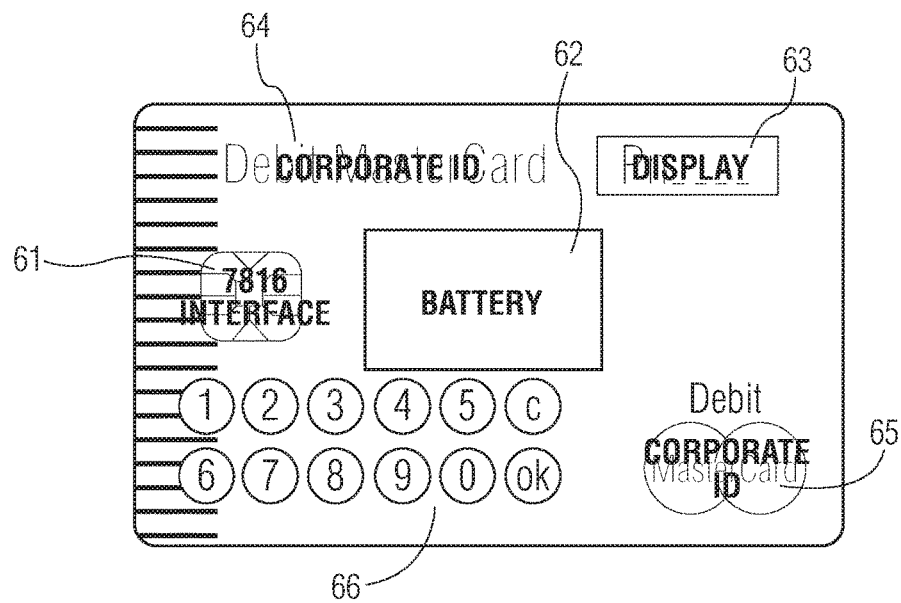
FIG. 11 is an illustration of blocking areas for interactive sensors in prior art authentication cards.
Figure 14:
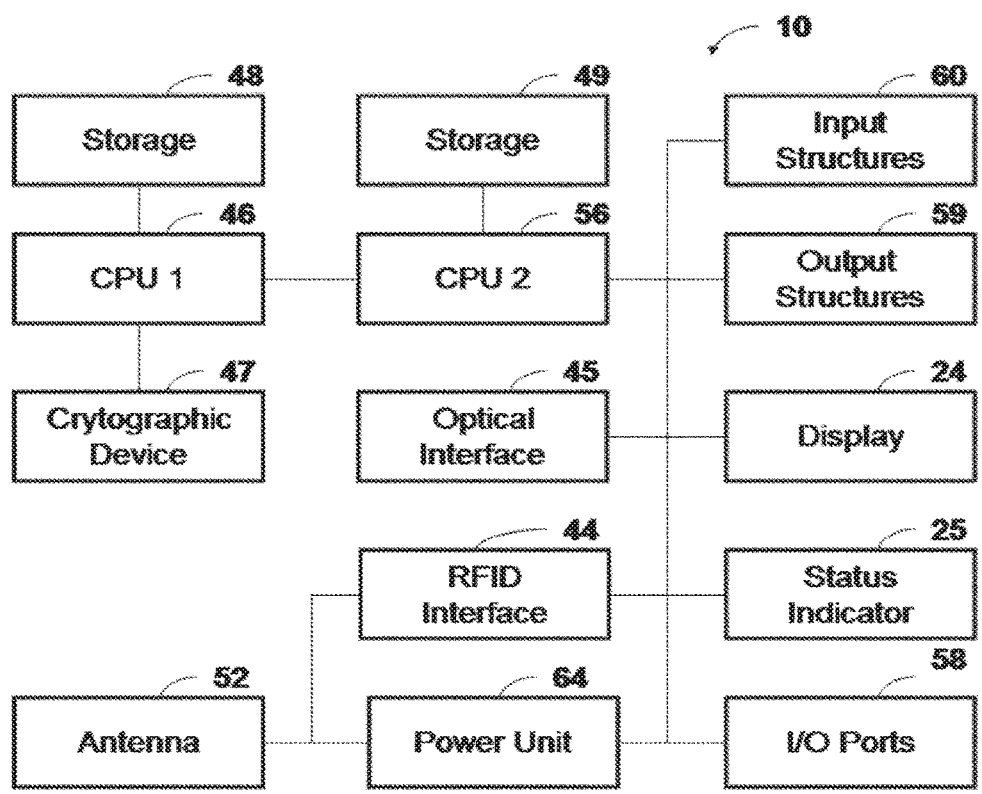
FIG. 14 is a second simplified block diagram of the device of FIG. 12 in accordance with an embodiment of the invention.

FIG. 14 is a second simplified block diagram of the device of FIG. 12 in accordance with an embodiment of the invention. FIG. 14 illustrates another embodiment of token 10. The difference with the embodiment described with reference to FIG. 13 is the RFID interface being connected to the second CPU 56 instead of the first CPU 46. The benefit of this implementation is compatibility with less expensive security controllers. As mentioned above, a user may enter tactile patterns using the input structures 60 located on external surfaces of the token 10. The user input structures 60 may include the input structures 14, 15, 16 shown in FIG. 1 and may communicate with the first CPU 46 through the second CPU 56.

To facilitate lifetime requirements of electronic documents and ease of use, the token 10 may include an integrated power unit 64 for powering the token 10 by an external electromagnetic field without the need for an embedded battery. The power unit 64 may include one or more super capacitors for the purpose of energy buffering.

In order to avoid reliability problems a battery is not integrated into the token and the system is directly powered by an external electromagnetic field. Special measures may be taken to enable battery-independent power supply by utilizing ultra-low-power microcontroller units (MCU) for the first CPU 46 and the second CPU 56.

Multifunctional Smartcards have far higher power requirements than single chip cards. Higher power translates into higher load (less impedance) of the antenna circuit. As a consequence, the quality factor of the resonator circuit reduces so much that the coupling between the reader's loop antenna and the Smartcard's loop antenna acts as a transformer coupling. From that perspective, a completely different coupling approach is required for multifunctional Smartcards.

In authentication applications a supply of multiple cards is not wanted as it could introduce security leaks. In order to provide maximum available power to a single Smartcard so-called power matching is utilized. Power matching requires the source impedance and the load impedance to be conjugate complex. In order to match the low load impedance with the high reader impedance a load transformation is implemented by attaching the load impedance to a tap of the Smartcard's antenna. As a consequence, the load is transformed by the square of the ratio between the tap turns to the total amount of turns. Beside load transformation the tapped antenna also provides voltage transformation, resulting in a lower voltage $u_{rectified}$. This is desirable because modern chip fabrication processes have far lower supply voltage limits than older processes. Power matching is implemented for the operational point of the Smartcard's maximum specified supply current.

Figure 15:
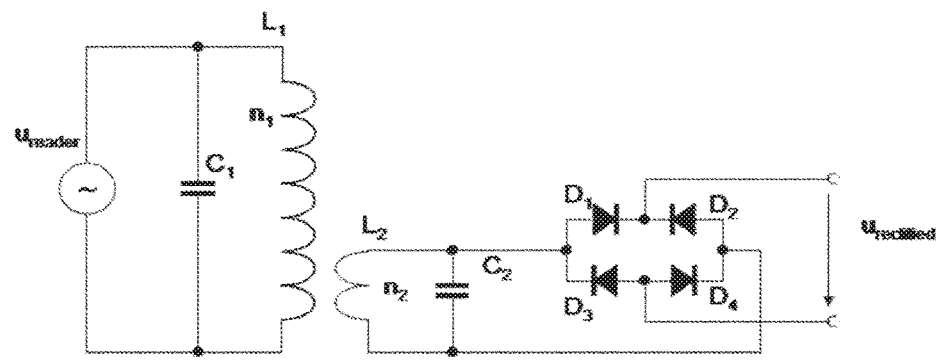
FIG. 15 is a schematic of a contact-less power supply involving load transformation.

FIG. 15 is a schematic of a contact-less power supply involving load transformation. As illustrated by FIG. 15 a loop antenna L1/L2 with 2 to 3 turns is used to achieve power matching. Tuning capacitor $C_2$ is directly connected to the antenna. In case of the proposed antenna with $n_2=2$ turns instead of 7 turns a load impedance transformation by a factor of ~12 may be achieved, resulting in a far more efficient energy transfer.

Figure 16:
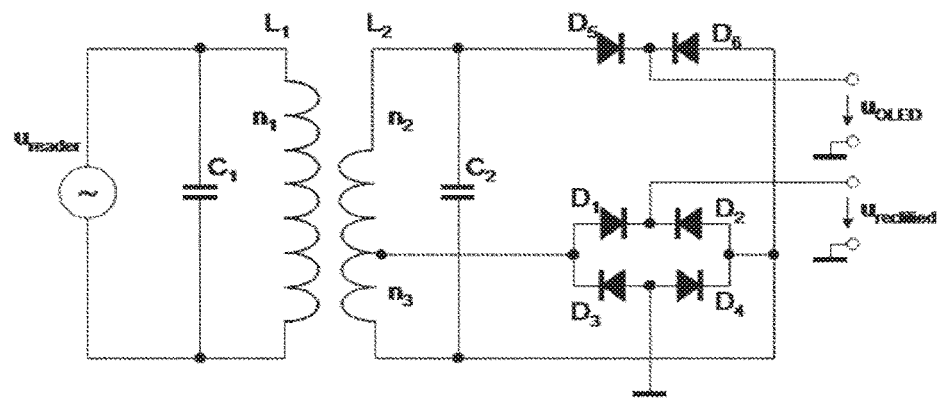
FIG. 16 is a schematic of a contact-less power supply involving load transformation and an additional supply path for organic electronics.

FIG. 16 is a schematic of a contact-less power supply involving load transformation and an additional supply path for organic electronics. FIG. 16 illustrates a rectifier configuration that may provide a high voltage to organic electronics like OLED displays. The logic supply $U_{rectified}$ may be generated from a tap with 2-3 turns for best power matching. The tuning capacitor $C_2$ may be connected to the top of $L_2$. The OLED supply may provide up to 6V.

The token 10 allows access to user input structures 14, 15, 16 through which a user may interface with the device. Each user input structure 14, 15, 16 may be configured to sense tactile patterns when actuated. For example, the input structure 14 may include an area for sensing tactile patterns which, when entering a tactile pattern, causes the tactile pattern to be captured and to be associated with reference tactile patterns with the purpose of decoding said tactile patterns and providing the associated tactile patterns to the token 10 for further processing. The input structure 15 may include a key, that when touched, causes a related digit to be entered into the token for further processing by the token 10. The input structure 16 may include a button that, when touched, causes a user interface function to be executed, which function may comprise deleting the last associated tactile pattern or cancelling the entry of a secret using tactile patterns. In general, the token 10 may include any number of user input structures existing in various forms including buttons, keys, switches, sliders, input pads, or other suitable forms.

An important aspect of the invention is to install a private inverse transfer function on a contact-less powered Smartcard that may act as decoding function for tactile patterns that have been utilized by a user to transfer or encode a secret into a user-encoded secret. In order to have an interactive Smartcard that can be used for on-card matching applications, a tactile pattern sensing interface may be embedded and the installed private inverse transfer function may be utilized for decoding sensed tactile patterns.

Tactile pattern decoding as disclosed here implements an approach that differs from normal online handwriting recognition ("OHR"). Normal OHR recognition systems target at a best possible recognition despite all user-dependent differences in tactile pattern generation. If all user-related differences in generating the tactile patterns are excluded from tactile pattern recognition and only the user-independent characteristics are utilized for pattern recognition a huge entropy reduction of the involved code space of tactile patterns will occur.

This entropy reduction is not acceptable for authentication purposes. The main objective of an authentication system is the identification of a user. A best possible identification requires all available user-related information being considered during authentication. From that perspective it is irrelevant whether thirds can recognize a tactile pattern of a user. In order to maintain the entropy of a tactile pattern it must not be translated into any intermediate meaning that thirds may understand. For that reason the approach disclosed here is based on the fact that only the user is able to assign a unique meaning to every of his tactile patterns. The objective of the invention is not to recognize a tactile pattern but to associate a tactile pattern by assigning a new member of a different character repertoire to a tactile pattern. Recognizing would imply that the tactile pattern is converted into an understandable intermediated format which is not desired in case of authentication systems.

Figure 17:
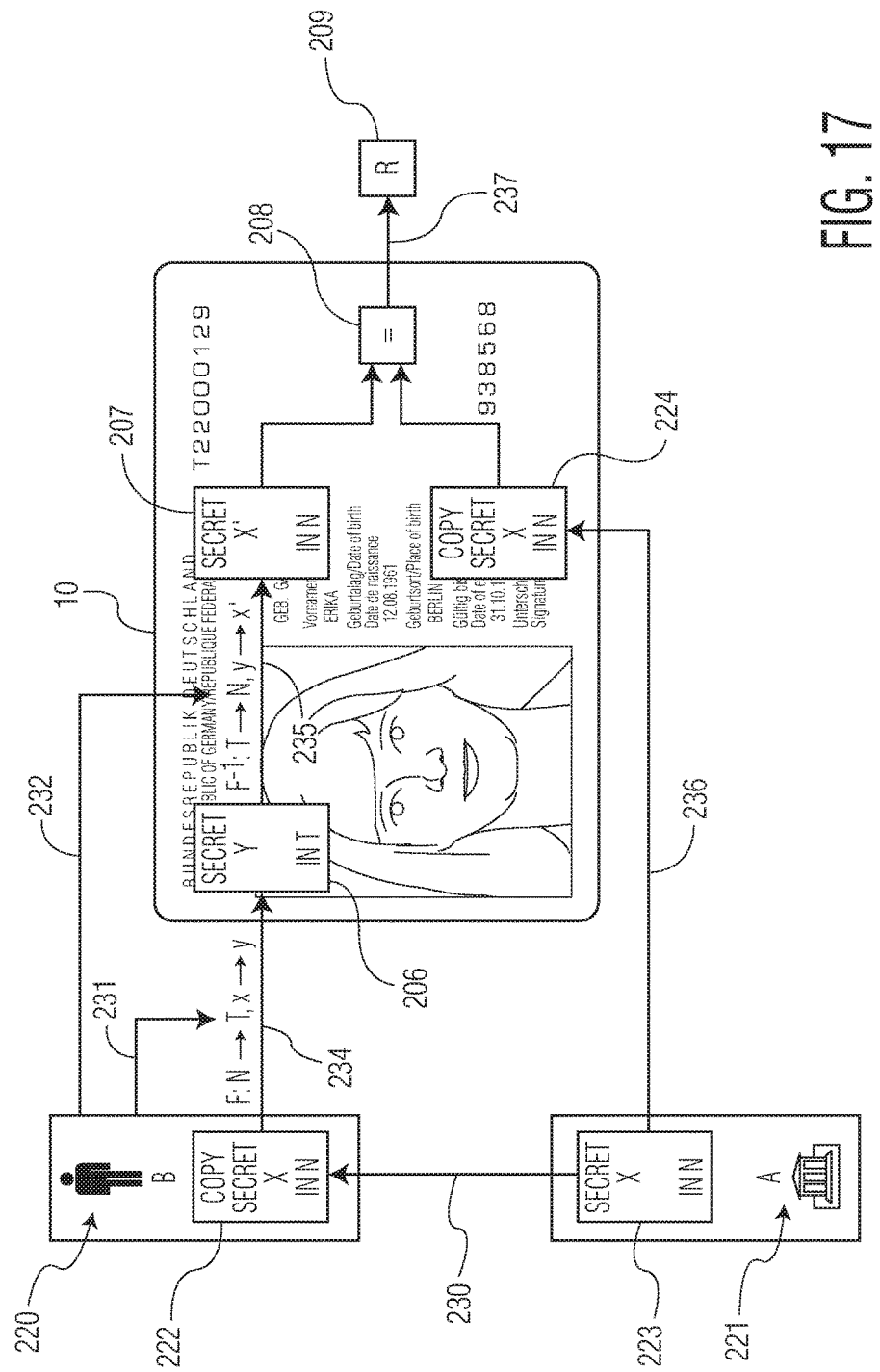
FIG. 17 is an illustration of a secret verification approach based on tactile patterns.
Figure 18:
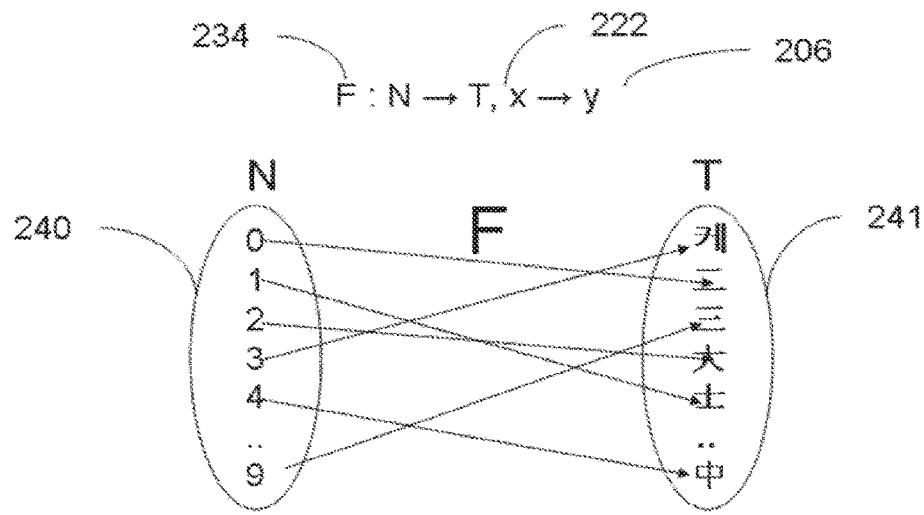
FIG. 18 is an illustration of a transfer function used to encode a secret by using tactile patterns.
Figure 19:
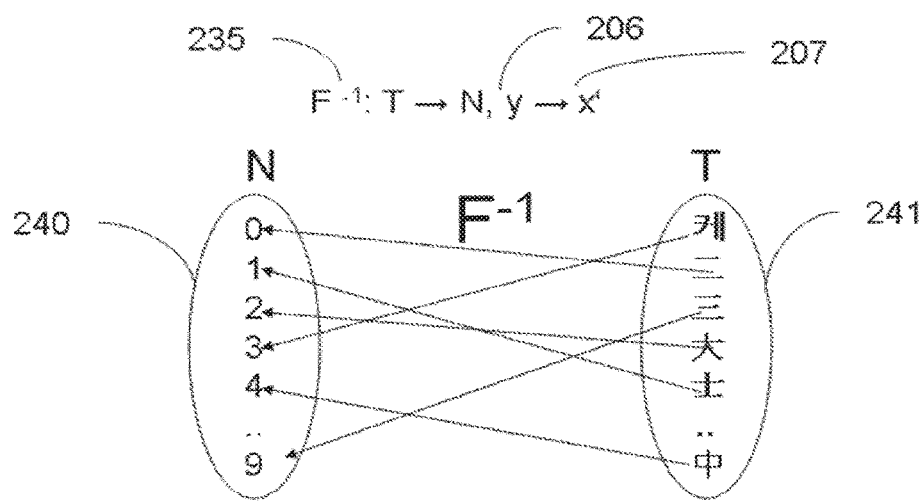
FIG. 19 is an illustration of an inverse transfer function used to associate a secret represented by tactile patterns.

The approach is illustrated by FIG. 17, FIG. 18 and FIG. 19. FIG. 17 is an illustration of a secret verification approach based on tactile patterns.

An issuing authority 221 generates a secret x 223 utilizing code repertoire N 240. It sends 230 a copy of the secret 222 to the user 220. Another copy 224 of the same secret x is installed on token 10.

By entering his representation of the secret 222 the user 220 defines 231a private transfer function F 234 that he applies to the copy of the secret x 222, thereby effectively encoding the secret, resulting in a user-encoded secret y 206, which is the tactile pattern entered into the tactile sensor 14. The user-encoded secret y 206 is constructed from the character repertoire T 241 of all tactile patterns. The private transfer function F 234 is only known to the user 220.

Before using token 10 for the first time the user 220 may install 232 a private inverse transfer function $F^{-1}$ 235 on the token 10. When the user 220 has entered the user-encoded secret y 206 the token 10 may apply the inverse transfer $F^{-1}$ 235 to that user-encoded secret y 206 resulting in a decoded secret x' 207 that utilizes the same character repertoire as the secret x 223.

Defining a private inverse transfer function $F^{-1}$ 235 is very useful if the user wants to implement a code conversion from digits to alphanumeric characters, for example, or wants to add an additional character set.

The verifier 208, also referred to as comparison unit 208, verifies the decoded secret x' 207 against the copy of the secret x 224 installed on the token 10 and communicates the verification result to a receiver 209. In this approach the issuing authority 221 has no knowledge of the private transfer function 234 and the private inverse transfer function 235.

FIG. 18 is an illustration of a private transfer function used to encode a secret by using tactile patterns. Illustrated by FIG. 18 is a limited character repertoire N 240 that may be used to encode the copy of the secret x 222.

As an example, character repertoire N 240 may represent the natural numbers from 0 to 9 which is the case with PIN entries, and the character repertoire T 241 may represent tactile patterns such as written characters, icons, signature short-cuts, and many more in all writing styles. A four-digit secret x 222 may be transferred by function F 234 into a user-encoded secret y 206 represented by a sequence of four tactile patterns. The private inverse transfer function $F^{-1}$ 235 should be unambiguous for at least the elements of the character repertoire T 241 that are used to encode the secret x 222; otherwise it will be impossible to associate the user-encoded secret y 206. In case of a large group of users, which is typical for authentication applications, the code space created by character repertoire T 241 is huge.

In reality the reproducibility of the same tactile patterns and the decoding process are not ideal. In order to optimize the overall decoding performance the private inverse transfer function according to the invention may be configured to utilize the variance between tactile patterns of the same meaning to minimize user-specific spread between the same tactile patterns.

FIG. 19 is an illustration of an inverse transfer function used to associate a secret represented by tactile patterns. FIG. 19 further illustrates decoding of the user-encoded secret y 206 that may be achieved by applying the private inverse transfer function $F^{-1}$ 235. A natural spread in generating the tactile pattern, i.e. the user-encoded secret y 206, will result in a spread of the secret x' 207 when the private inverse transfer function $F^{-1}$ 235 is applied.

According to an embodiment of the invention the private inverse transfer function $F^{-1}$ 235 is implemented by a set of private reference tactile patterns provided by the user 220. Decoding the user-encoded secret y 206 can be achieved by correlating the user-encoded secret y 206 with every member of the character repertoire T 241. The correlation results may be evaluated by a classifier that may consider the variance between the same tactile patterns. The variance between the same tactile patterns may compensate spread of the decoded secret x' 207.

Both the private transfer function F 234 and the private inverse transfer function $F^{-1}$ 235 are only known to the user. This knowledge is difficult to capture by unauthorized persons. Therefore, additional security is provided for the entry of a secret.

The ability to define an arbitrary private inverse transfer function $F^{-1}$ 235 may enable a user to translate the copy of the secret x 222 into any combination of tactile patterns, which enables easy localization of the secret 222 by applying tactile patterns representing any local or foreign characters that are elements of the character repertoire T 241.

Figure 20:
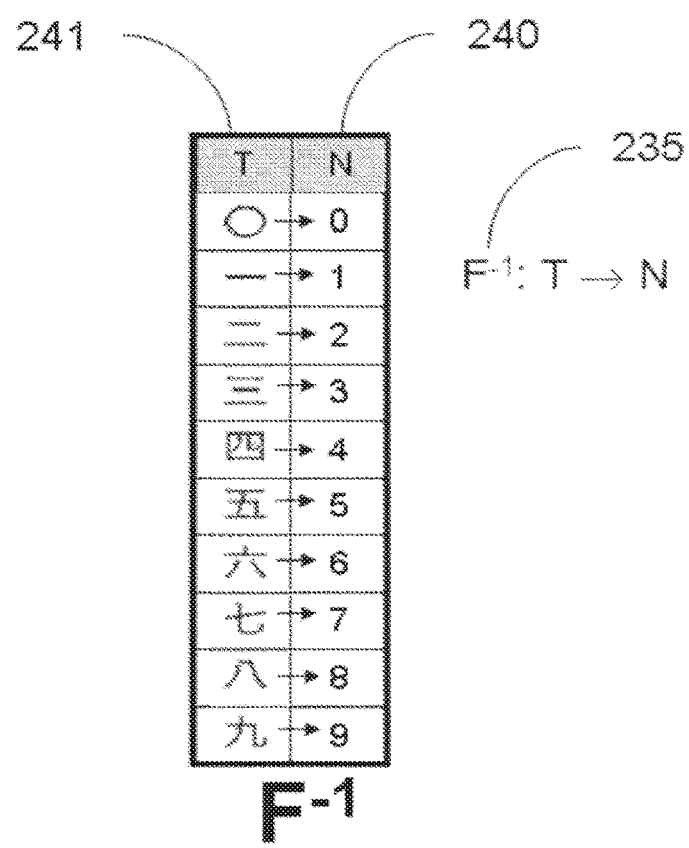
FIG. 20 is an illustration of an inverse transfer function used to associate Chinese numbers to ordinals.

FIG. 20 is an illustration of an inverse transfer function used to associate Chinese numbers to ordinals. In particular, it illustrates an example of a private inverse transfer function $F^{-1}$ 235 that translates a one digit number in the character repertoire T 241 comprising Chinese number tactile patterns into single digit numbers ranging from 0 to 9 in the code range N 240.

Figure 21:
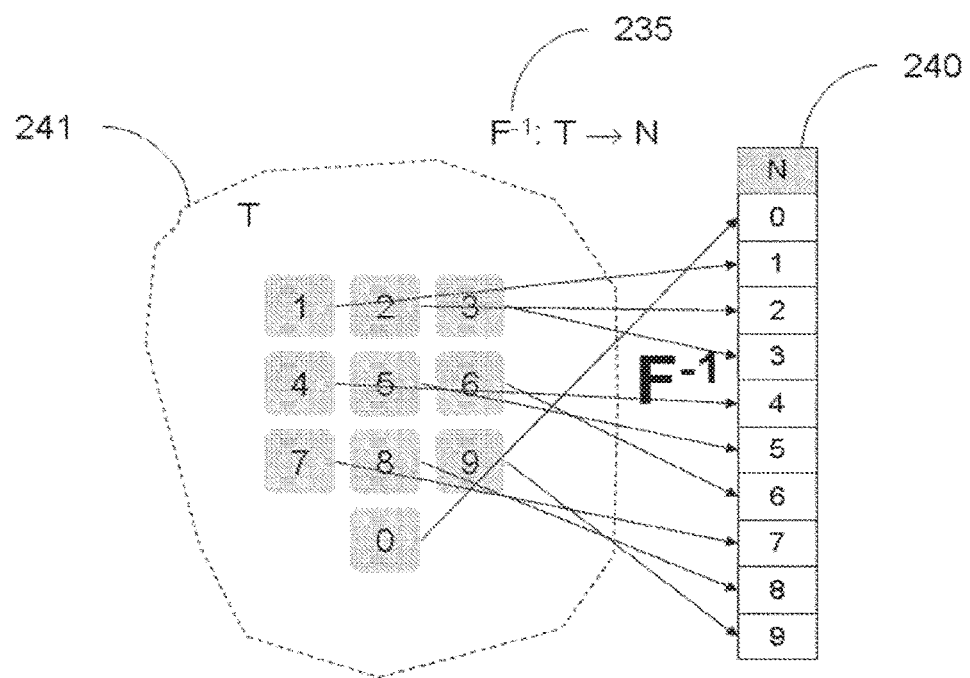
FIG. 21 is an illustration of an inverse transfer function used to associate keypad positions to ordinals.

FIG. 21 is an illustration of an inverse transfer function used to associate keypad positions with ordinals. In particular, it illustrates in another example a private inverse transfer function $F^{-1}$ 235 that translates a single digit key position in the character repertoire T 241 comprising ten key positions into single digit numbers ranging from 0 to 9 in the code range N 240.

By combining the character repertoires of FIG. 20 and FIG. 21 a tactile pattern decoder for Chinese numbers and ten key-pad positions may be defined, which enables decoders that may support multilingual applications.

Beyond the methods illustrated by FIG. 20 and FIG. 21 character repertoires can be extended by
  document owner specific writing characteristics;
  document owner specific code conversions, for example translation of a 4-digit-PIN into a 4-character password;
  document owner specific local character sets, in which case the tactile patterns can be based on language characters (Latin, Chinese, Japanese, Persian, That etc.) and numerals (Arabic, Chinese, Roman etc.);
  inclusion of position codes (button press at a certain location), user interface controls (back, forward, up, down);
  document owner specific graphical symbols (i.e. used by analphabets);
  document owner specific signature short-cuts;
  an arbitrary combination of feasible methods.

For example, it is feasible in that way to convert a 4-digit PIN into a 3-character password combined with a signature shortcut.

Figure 22:
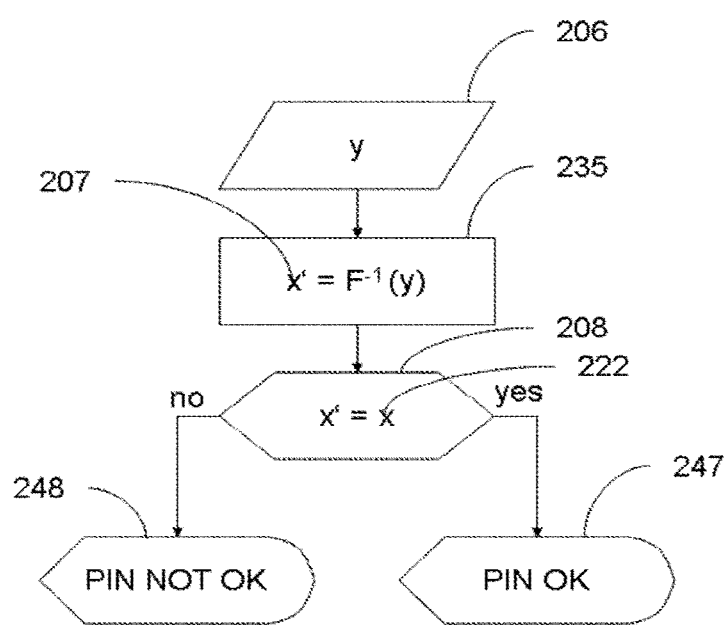
FIG. 22 is a flowchart illustrating the application of an inverse transfer function in the decoding of tactile patterns.

FIG. 22 is a flowchart illustrating the application of an inverse transfer function in the decoding of tactile patterns. In particular, it illustrates decoding of the user-encoded secret y 206 represented by a sequence of tactile pattern data streams. token 10 is configured to execute the private inverse transfer function $F^{-1}$ 235 on a sequence of tactile pattern data streams y 206 resulting in the decoded secret x' 207. The decoded secret 207 is compared with the copy of the secret 222 stored in the token in verification step 208. Dependent on the result of verification step 208 a signal "PIN OK" 247 is generated or a signal "PIN NOT OK" 248 is generated.

Figure 23:
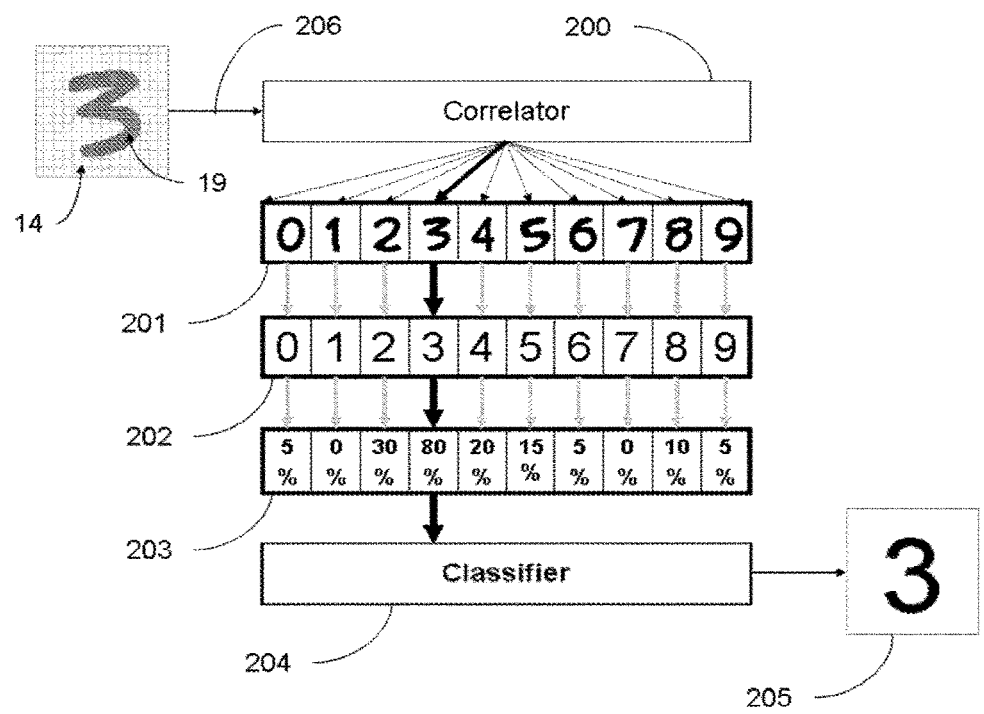
FIG. 23 is an illustration of the inverse transfer function used to associate tactile patterns.

FIG. 23 is an illustration of the inverse transfer function used to associate tactile patterns. In particular, it shows an example of an implementation of said inverse transfer function. As an example, for detection of a 4-digit PIN a group of 10 reference tactile pattern data streams 201 representing the digits "0" to "9" may define the private inverse transfer function $F^{-1}$ 235 and may be stored in token 10. Said storing may be performed in a configuration mode of the token 10. A code conversion table 202 may be stored on the same token 10 that may assign a digit from "0" to "9" to each of the reference tactile pattern data streams 201 in a way that a reference tactile pattern meaning "1" may be associated to the digit "1", a reference tactile pattern meaning "2" may be associated to the digit "2" and so forth. If for example a user may draw one tactile pattern 19 with the meaning "3" on the tactile sensing sensor 14, the tactile pattern 19 may be converted by the tactile pattern sensor 14 into a tactile pattern data stream 206. The tactile pattern data stream 206 may be correlated by the correlator 200 with the group of tactile reference data streams 201.

The correlation result 203 may be evaluated by the classifier 204. The classifier may select the most probable candidate from the group of tactile reference data streams 201 and may assign the member from the code conversion table 202 that is associated to said most probable candidate. If, for example, the user enters the four digits "1234" by drawing them sequentially on the token's sensing device 14—wherein each of the drawn digits represents one sensed tactile pattern 19—then the token 10 may associate as described above each sensed tactile pattern data stream 206 with each of the ten reference tactile pattern data streams 201 stored in the token and determine the probability of coincidence 203.

The classifier 204 may evaluate for each sensed tactile pattern stream 206 the most probable candidate form the group of reference tactile data streams 201. The classifier 204 may then assign for each of the most probable reference tactile data streams a member from the code conversion table 202 that is associated to said most probable candidate. As a result the classifier may have associated the digits "1", "2", "3" and "4" in that order to the sequence of the four sensed tactile data streams 206, that may have resulted in this example as a sequence of digits 205 that reassemble the secret "1234". Upon availability of the reassembled (i.e. decoded) secret optical or acoustical feedback may be provided to the user. The reassembled secret may be verified against a stored copy of the secret. The verification result may be communicated to another device in encrypted format for the purpose of authenticating the user.

Figure 24:
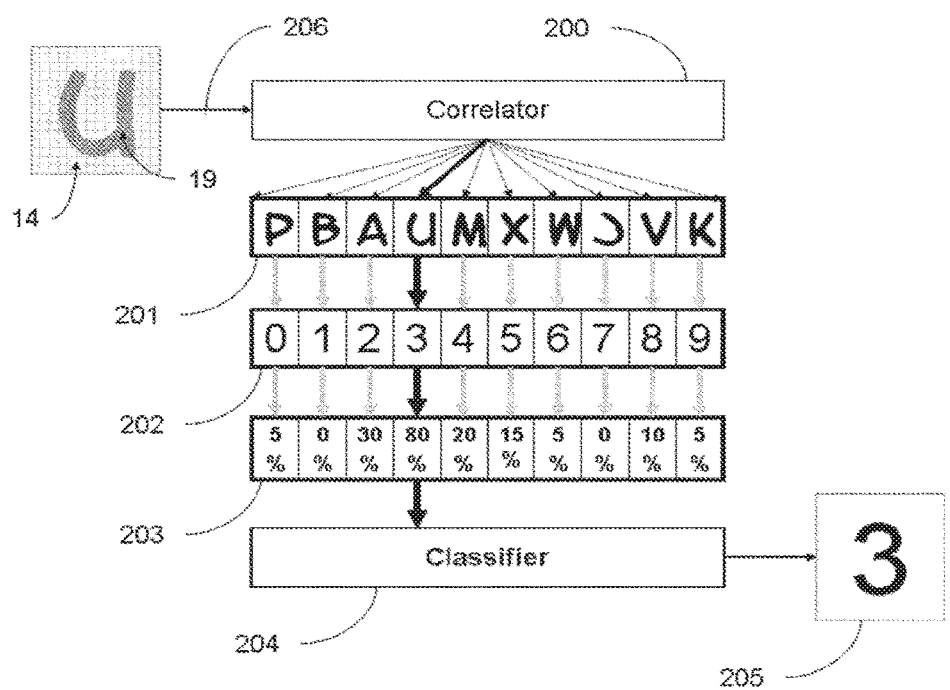
FIG. 24 shows another example of the inverse transfer function.

FIG. 24 shows another example of the inverse transfer function. In particular, it shows the power of the private inverse transfer function. The user has assigned his private character repertoire. Applying the same example as in FIG. 23 the user may now assign the password "BAUM" as his private secret to the secret "1234". It will be appreciated that in this case the private inverse transfer function is very useful.

Figure 25:
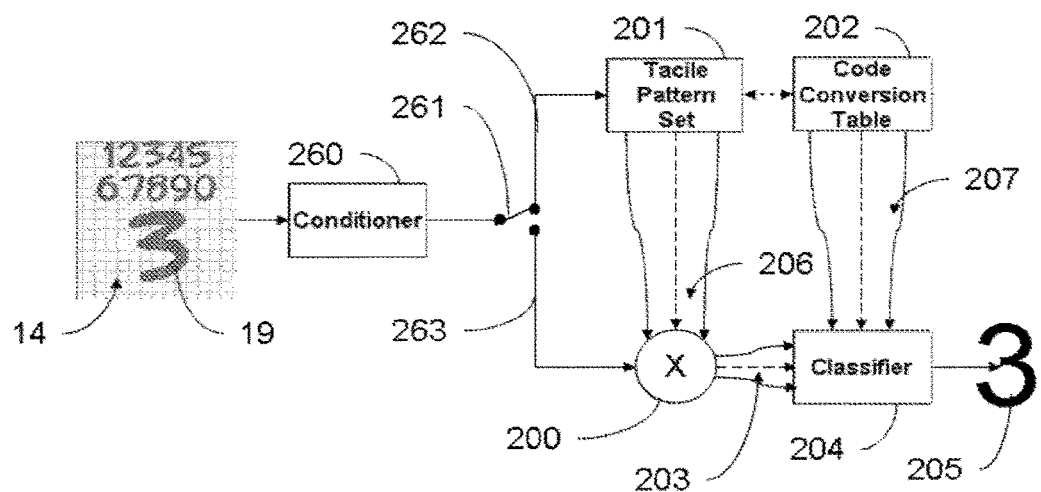
FIG. 25 is an illustration indicating the installation of the inverse transfer function on a token.

FIG. 25 is an illustration indicating the installation of the inverse transfer function on a token. In particular, it illustrates as an example the definition of the private inverse transfer function $F^{-1}$ 235 by the user in a configuration mode of the token. Switch 261 connects the output of the conditioner 260 to the input of the tactile pattern set storage 201. The user 220 may enter personal tactile pattern samples 19 for every member of the tactile pattern set 201 through the tactile pattern sensor 14 which may detect tactile patterns and provide a tactile pattern data stream to conditioner 260. The conditioner 260 formats the tactile pattern stream such that it can be utilized for correlation. Signal conditioning by the conditioner 260 may include linear and/or non-linear functions like amplification, coordinate-transformation, noise reduction, time-scale conversion, time-warping, scaling and more.

Figure 26:
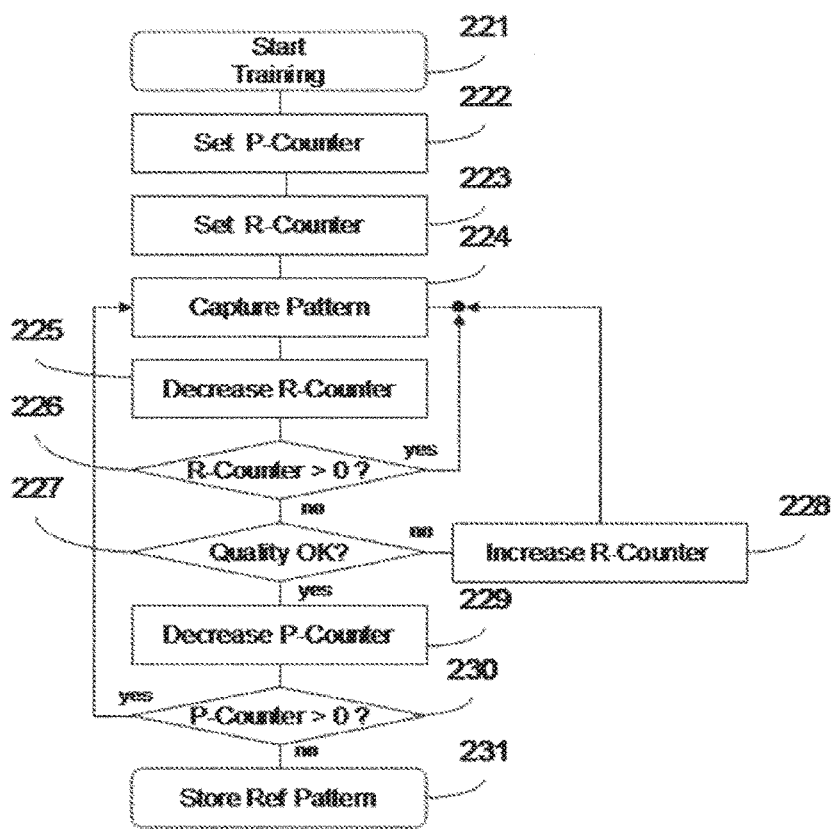
FIG. 26 is a flowchart illustrating the indicating the installation of the inverse transfer function on a token.

FIG. 26 is a flowchart illustrating the installation of the inverse transfer function on a token. In particular, it illustrates the generation of all reference tactile patterns required to define the private inverse transfer function defined by the tactile pattern set 201. The P-Counter 222 is set to the size of the character repertoire. For every member of the tactile pattern set 201 multiple revisions of the same pattern, the amount being defined by the R-Counter, are captured. More revisions are captured if the quality of the reference pattern is not sufficient for the correlation process. When all patterns have been captured in sufficient quality the complete collection of reference is stored. This reference tactile pattern collection represents the user-specific characteristics of the character repertoire T 241.

Figure 27:
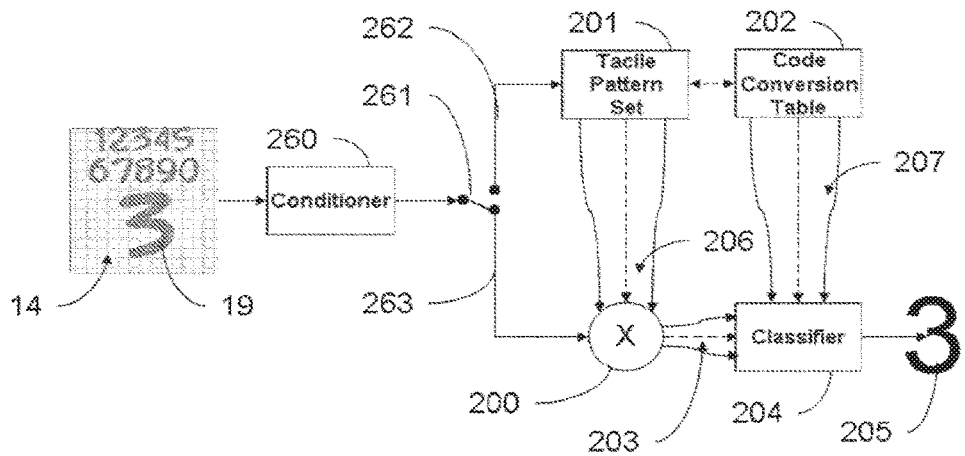
FIG. 27 is an illustration indicating the application of the inverse transfer function installed on a token for tactile pattern decoding.

FIG. 27 is an illustration indicating the application of the inverse transfer function installed on a token for tactile pattern decoding. In particular, it illustrates the use of token 10 in authentication mode after the private inverse transfer function has been installed in the configuration mode. Switch 261 connects the output of the conditioner 260 to the input of the correlator 200. The tactile pattern data 19 may be sensed by the tactile pattern sensor 14 resulting in a tactile pattern data stream that may be conditioned by the conditioner 260 as described above. The output of the conditioner 260 may be correlated by the correlator 200 with every reference tactile data stream 206 stored in the tactile pattern set 201. The correlation results 203 may be evaluated by classifier 204 under consideration of the variance between the same tactile patterns. The decoded secret 207 may be reassembled from the output sequence provided by the classifier 204.

In the following description of exemplary embodiments reference is made to tactile patterns which are "associated". In this context, "associated" means that elements of the code space of the secret (such as digits of a PIN) have successfully been associated (by the decoding unit) with corresponding elements of the code space of tactile patterns.

The approach disclosed here utilizes the same tactile pattern sensor 14 and the same signal conditioner 260 for the definition of the private inverse transfer function (configuration mode) and for the authentication function (authentication mode). Thereby, a fully differential decoding system is implemented. In reality this fully differential decoding system is able to cancel out most non-linearity introduced by the tactile sensor 14 as well as by the conditioner 260 yielding a decoding system that better copes with manufacturing spread. The differential approach is especially useful for cancelling off effects caused by non-linear processing functions in conditioner 260. Canceling the device-specific variation of the tactile sensor 14 corresponds to decoding a signal that had been encoded by a physical unclonable function. This physical unclonable function caused by the device-specific sensor variation introduced during token manufacturing contributes to the private transfer in the configuration mode. In the authentication mode, the device-specific sensor variation inversely contributes to the private inverse transfer function, resulting in a decoding of the physical unclonable function applied by the sensor device variation in the configuration mode. As a consequence, a private inverse transfer function that is installed on one token device may not work on another token device. The device-specific sensor variations further increase the code entropy of the encoded secret 206 due to the differential approach.

Figure 28:
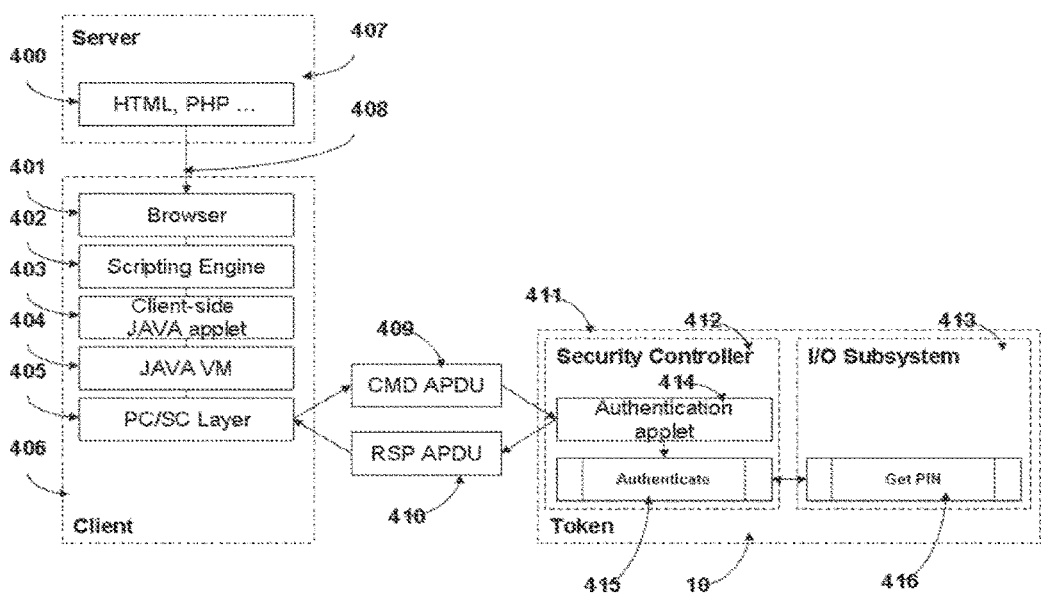
FIG. 28 is an illustration of a token being implemented as access verification device in a web application.
Figure 29:
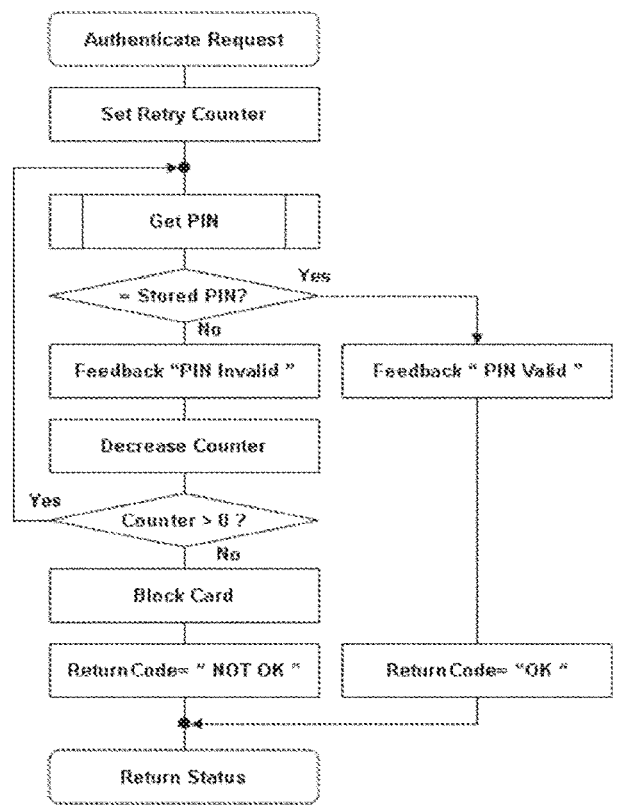
FIG. 29 is a flowchart of the "Authenticate"-subroutine that is executed on the first CPU 46 as part of the web application of FIG. 28.
Figure 30:
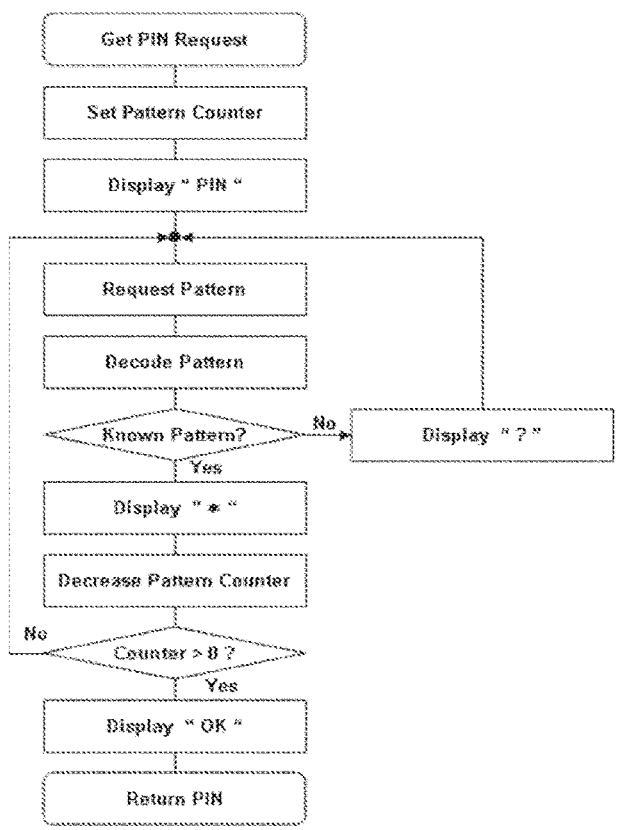
FIG. 30 is a flowchart of the "Get PIN"-subroutine applet that is executed on the second CPU 56 as part of the "Authenticate"-subroutine of FIG. 29.

FIG. 28 is an illustration of a token being implemented as access verification device in a web application. FIG. 29 is a flowchart of the "Authenticate"-subroutine that is executed on the first CPU 46 as part of the web application of FIG. 28. FIG. 30 is a flowchart of the "Get PIN"-subroutine applet that is executed on the second CPU 56 as part of the "Authenticate"-subroutine of FIG. 29.

FIG. 28 illustrates the integration of token 10 into a web-based application. A web-based application such as a shopping portal 400 is installed on a server 407. A user connects to the shopping portal 400 through a browser 401 running on a client 406. A JAVA applet 403 utilizing the JAVA I/O API connects as an example to the standard PC/SC-layer 405 on a Windows PC that enables access to Smartcards using application protocol data units (APDUs). A command APDU 409 triggers the start of the authentication applet 414. Applet 414 is running on the first CPU 46 on token 10 and starts the "Authenticate"-routine 415 that is further detailed by FIG. 29.

The "Authenticate"-routine 415 sends a "Get PIN" request 416 to the second CPU 56 that is responsible for the I/O subsystem. The "Get PIN" request 416, which is further detailed by FIG. 30, invokes the tactile pattern decoder as described above.

Upon completion of the tactile pattern decoding the reassembled authentication information is returned. The "Authenticate"-routine 415 verifies the authentication information by comparing it against a stored copy. The "Authenticate"-routine involves a retry count mechanism that stops the authentication after a limit of wrong authentications has been reached. If the authentication is successful the verification result is transferred in a response APDU 410 through the PC/SC-layer 405 back to the JAVA applet 403. The JAVA applet returns the response through the browser 401 back to the shopping portal 400. Example applications using this approach are described further down in more detail.

Figure 31:
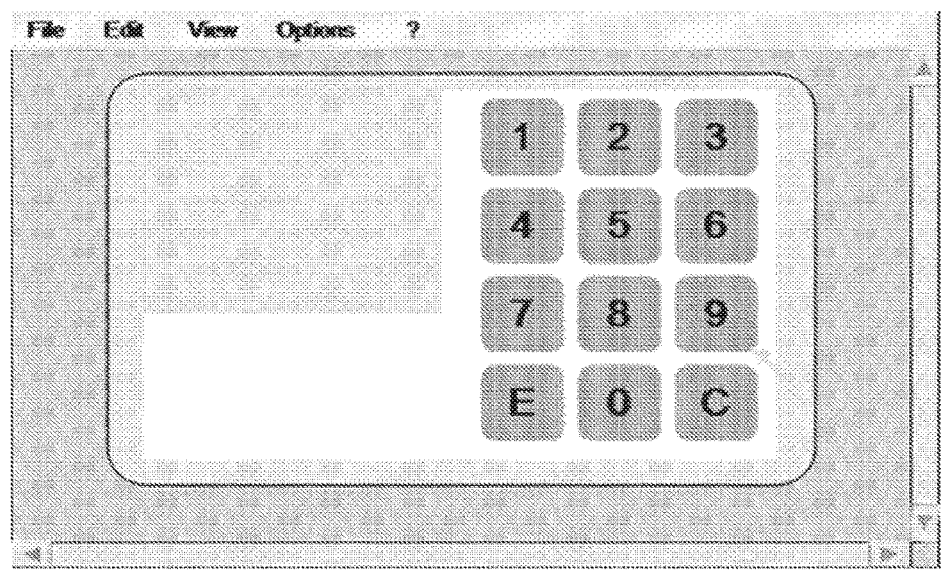
FIG. 31 is an illustration of a Graphical User Interface (GUI) that may be applied in installing factory-based inverse transfer functions on the token.
Figure 32:
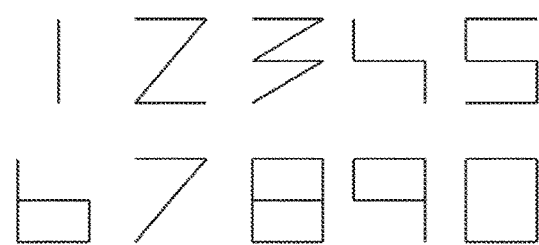
FIG. 32 is an illustration of a user independent tactile pattern set to be used for factory installment.

FIG. 31 is an illustration of a Graphical User Interface (GUI) that may be applied in installing factory-based inverse transfer functions on the token. FIG. 32 is an illustration of a user-independent tactile pattern set to be used for factory installment.

FIG. 31 illustrates an example of a user interface of a PC application that may be utilized to interactively define positions and shapes of buttons and interfacing elements through a graphical user interface. The interactive elements may be placed on a virtual Smartcard under consideration of card specific blocking areas. Upon design completion a reference tactile pattern set 201 may be generated by the software application and stored in token 10. This method may enable a document manufacturer to pre-install for example an initial keypad interface that is required to authorize access to the token 10 through a personal unlock key for enabling the definition of the private inverse transfer function in the configuration mode of the token 10 (user training). An example for a tactile pattern set required to unlock the device is illustrated by FIG. 32.

A release foil indicating the key pad positions may be attached to the card when it is delivered to the user. The foil may also include a tactile marking pattern to support visually impaired users. When token 10 has been trained by the user the pre-installed tactile patterns may be replaced by the trained reference tactile pattern set. Reference tactile patterns may be defined by the document manufacturer (position codes representing buttons) or by the document owner, i.e. the user (personal handwriting). The document manufacturer may also apply restrictions related to the size of character repertoires and blocking areas.

Figure 33:
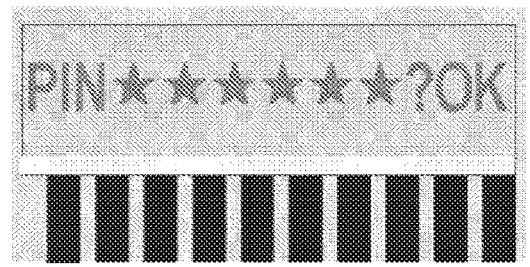
FIG. 33 is a detailed view of an electrochromic icon display according to an embodiment of the invention.
Figure 34:
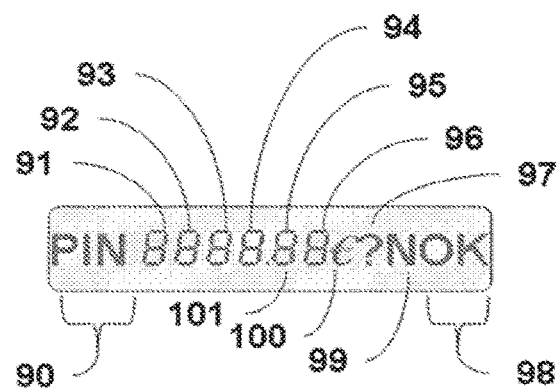
FIG. 34 is a detailed view of an electrochromic combinational display providing icons for fixed content and segmented digits for variable number display according to an embodiment of the invention.
Figure 35:
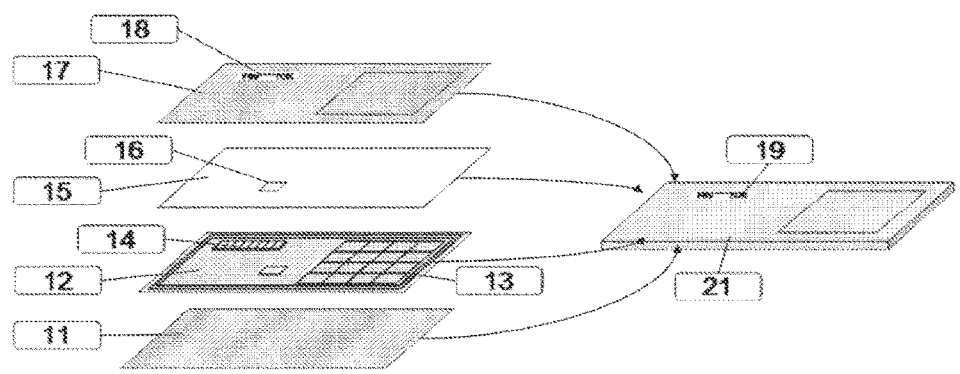
FIG. 35 is an illustration of display integration by printing according to an embodiment of the invention.

FIG. 33 is a detailed view of an electrochromic icon display according to an embodiment of the invention. FIG. 34 is a detailed view of an electrochromic combinational display providing icons for fixed content and segmented digits for variable number display according to an embodiment of the invention. FIG. 35 is an illustration of display integration by printing according to an embodiment of the invention.

The token 10 may also include a display 24 which may display various characters or icons under control of the device. For example, the display 24 may show a text string "PIN ?" to request the entry of a personal identification number (PIN), a text string "PIN OK" to feedback the successful entry of a digit sequence, among others. The display 24 also may display other text strings or icons 31 that provide feedback to a user, such as successful tactile pattern decoding, unsuccessful tactile pattern decoding, successful decoding of a sequence of tactile patterns, and the like. The display 24 may be any type of display such as a liquid crystal display (LCD), a light emitting diode (LED) display, an organic light emitting diode (OLED) display, an electrophoretic (ePaper) display, an electrochromic (EC) display, or any other suitable display. The display 24 may comprise icons, segments, or active areas that are later structured by a printed shadow mask. The display 24 may be used to display information that allows a user to interact with the device.

Generally, the content of display 24 may include characters and/or icons 33 that guide the entry of a secret into token 10. In most authorization applications the display content is quite limited as it is restricted to status information rather than displaying secret code information. Instead, secret information is masked. According to the invention the display content is limited such that it can be displayed with a minimum amount of icons.

For authorization purposes it is absolutely unwanted that the display content remains visible after the authorization process is finalized. Instead, the display must be cleared. In order to overcome these issues the invention utilizes an electrochromic display and in a further embodiment an OLED display. The electrochromic display is short-term bi-stable. The display content is fading out over time.

Instead of using a segmented display, solid icons are displayed that are capable of supporting a fairly comfortable authorization procedure. Display content like "PIN" can be displayed by a single segment or icon, the same applies e.g. for "OK" or "*" for indicating a masked digit. In another embodiment a combination of icons and segmented digits is applied that results in a more flexible but still economic display design.

The image quality of these icons is far better than that of a 14-segment alphanumeric display at the benefit of saving 41 control signals in case of "PIN" which relates to a chip size saving of 41 times the square of the driver IC's pad pitch, in this case 0.2 sqmm. Further saving is on test cost that is also pin-related. FIG. 34 illustrates a display type that offers both of the two worlds: crystal sharp icons 90 and 98-101 combined with variable 7-segment digits 91-96. This display can be used for authentication as well as for displaying currency values for e.g. a money card application.

The icons 90 and 97-101 are logically combined as one display unit as the digits are, resulting in seven display units with six times seven and one time six segments. This construction is controlled by a 7×7 matrix structure that requires 14 control lines.

Electrophoretic and LCD displays require special attention with respect to the supply voltage. In case of electrophoretic displays voltages well above 7V are required for a display update. The bi-stability of the electrophoretic displays is a drawback in authentication applications. From that perspective the invention disclosed here utilizes a printed electrochromic display having an operational voltage of 2.5V. In another embodiment, an OLED-display with a printed shadow mask is used and in a further embodiment a structured OLED-display is used.

The invention proposes to print a display, preferably an electrochromic or an OLED display, directly onto a substrate material used for the card construction. This approach results in a homogeneous card construction which is of key importance for governmental documents. Furthermore, no display pre-manufacturing step is required and the extra cost for the display substrate is avoided, which is the main cost contributor to the pre-manufactured display besides equipment depreciation.

Assembly according to the invention is illustrated in FIG. 35. The token body is fabricated from the four substrate layers 11, 12, 15 and 17. The display 14 is directly printed to the substrate 12 comprising the antenna 13. A transparent compensation layer 15 comprising an exemplary cut-out 16 that compensates the topology chips attached to layer 13 is assembled on top of layer 12. A transparent layer 17 comprising an unprinted window area 18 is assembled on top of layer 15. Finally a transparent layer 11 with inside print forms the backside of the token and is assembled below layer 12. The assembled layers are laminated applying temperature and pressure for a defined time, resulting in the token body 21 with the visible display beneath window 19.

The token 10 may also include a status indicator 25 which may display blink codes under control of the device. For example, the status indicator 25 may indicate a constant signal if a tactile pattern is being entered, a single short blink if a tactile pattern is associated, a triple short blink if a tactile pattern has not been associated, a long blink if a the required amount of tactile patterns has been successfully associated. The status indicator 24 may be any type of display element such as a liquid crystal element (LCD), a light emitting diode (LED) element, an organic light emitting diode (OLED) element, an electrophoretic (ePaper) element, an electrochromic (EC) element, or other suitable display elements. The status indicator 25 may be used to display information that allows a user to interact with the device, especially in the absence of a display 24. The information provided by the display indicator 25 may include various optical signals that are indicated under control of the token 10. Generally, the content of the status indicator 25 may include intensity modulated signals that guide the entry of a secret into token 10.

The electronic device or token 10 may also include various input and output (I/O) ports for implementation of communication lines like ISO14443, ISO7816, optical communication and the like. For debug purposes a JTAG interface and an ISO7816 contact interface may be provided.

The token 10 may also include an audio output structure 59. For example, the audio output structure 59 may include one or more sound transducers for outputting audio data. For example, the output structure 59 may indicate a constant tone if a tactile pattern is being entered, a single short beep if a tactile pattern is associated, a triple short beep if a tactile pattern has not been associated, a long beep if a required amount of tactile patterns has been successfully associated, a speech sample generated from a text string. The audio output structure 59 may be used to output sound information that allows a user to interact with the device, especially in absence of a display 24 and/or in absence of a status indicator 25. The information provided by the output structure 59 may include various audio signals that are indicated under control of token 10. Generally, the audio output structure 59 may include intensity modulated tone signals and speech messages generated under control of token 10 that guide the entry of a secret into token 10.

The token 10 may further include a radio frequency identification (RFID) communication interface 44. The RFID interface 44 may allow for close range communication with RFID devices or with NFC-enabled devices at standard data rates (up to 848 kb/s) and may comply with standards such as ISO1443, ISO 18092 or ISO 21481. In certain embodiments, the communication may occur within a range of approximately 0.5 to 2 cm. The close range communication with the ISO14443 interface 44 may take place via magnetic field induction, allowing the RFID interface 44 to communicate with RFID interfaces or with NFC interfaces.

Figure 36:
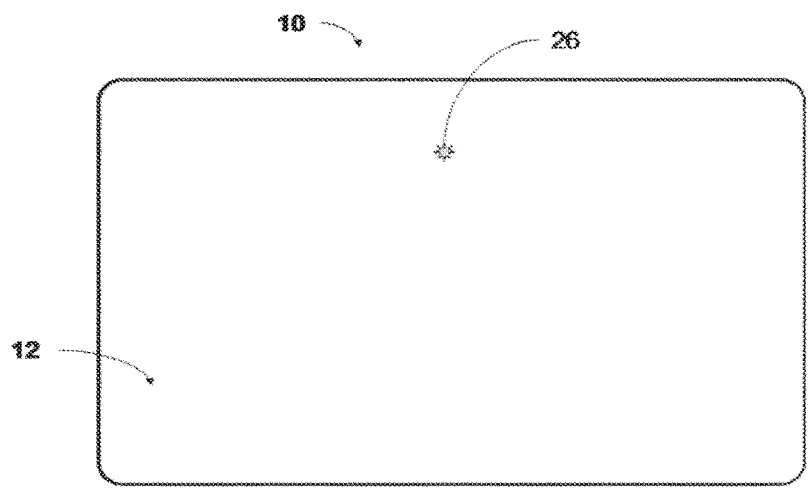
FIG. 36 is a detailed backside view of a token comprising optical backchannel communication.

FIG. 36 is a detailed backside view of a token comprising optical backchannel communication. For the purpose of a secure backchannel an optical communication link may be embedded into the token's body 12 at the token's 10 rear side, for example. The optical element 25 may be implemented as an active or reflective optical element 25 that may interface with an optical receiver embedded into another communication device such as a contact-less Smartcard reader. The optical element 25 may be implemented using technologies such as a liquid crystal element (LCD), a light emitting diode (LED) element, an organic light emitting diode (OLED) element, an electrophoretic (ePaper) element, an electrochromic (EC) element, or other suitable display elements. The backchannel enables the transmission of encrypted private information that must not be intercepted by thirds with the purpose of information decoding by any means.

According to an exemplary embodiment of the invention more than 50% of the cards surface area is provided for tactile pattern entry. The entry area is enlarged in one embodiment by using a portrait-style card format instead of the classical landscape-style.

As the tactile pattern decoding is independent of the tactile pattern's scale, also blind document-owners are able to enter tactile patterns. In case of blind document-owners acoustical feedback assists the tactile pattern entry. Untrained tokens may have a pre-configured training set installed that installs a key pad. The card may have a release foil attached which contains tactile key information. After training the release foil can be removed and the tactile sensing area is sufficient for entry by visually impaired users.

If the token is used in conjunction with an NFC-enabled Smartphone an ID1-sized token together with the Smartphone can be easily held by one hand while the other hand is used to enter tactile authentication information.

Figure 37:
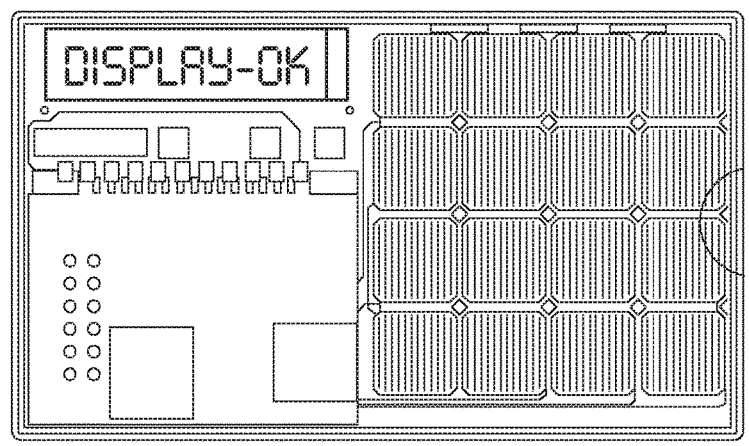
FIG. 37 is a detailed view of an electronic document inlay comprising a tactile sensing interface.
Figure 38:
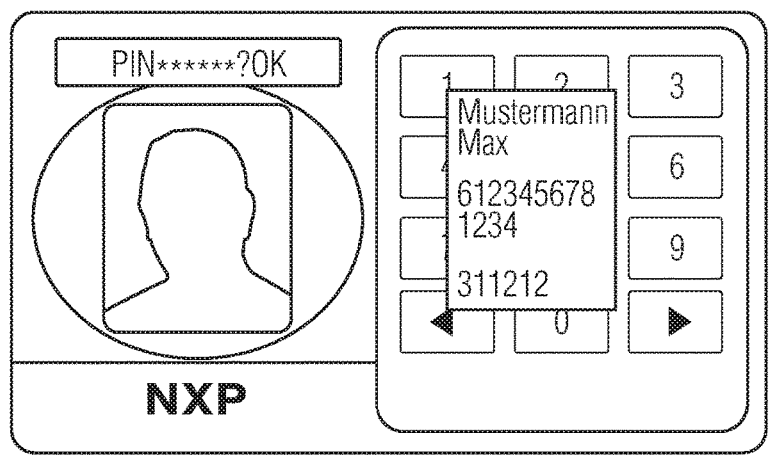
FIG. 38 is a detailed view of an electronic document comprising a tactile sensing interface inlay according to FIG. 37.

FIG. 37 is a detailed view of an electronic document inlay comprising a tactile sensing interface. The invention enables the generation of many configurations, such as the above-described configurations, from a single unified hardware design. Instead of positioning single-touch buttons the inlay as illustrated by FIG. 37 the token surface is overlaid by a two-dimensional sensor that senses tactile patterns entered through the cards surface.

According to an exemplary embodiment the tactile sensor is made of an array of capacitors that are affected by tactile patterns above them. A center-of-mass (or center-of-gravity) algorithm is applied to calculate a position from the activity-levels of all sensor capacitors. In a further embodiment the layer underneath the sensing capacitors is made compressible. A counter-electrode underneath each of the sensing capacitors forms together with the electrodes of the sensing capacitors another capacitor in vertical direction that depends on the distance between the sensing capacitor and the counter plate. The distance depends on mechanical pressure applied to the sensor surface, resulting in a pressure-dependent capacitor. The pressure sensor is required to add pressure information to the writer-dependent characteristics.

A software definition of button position and button diameter is used to define button areas to which functions are allocated. The same approach is used to define even more advanced interaction functions. When the button positions and functions are defined they can be supported by the surface print design. The surface print is normally applied to the inside of the card's top layers.

Figure 39:
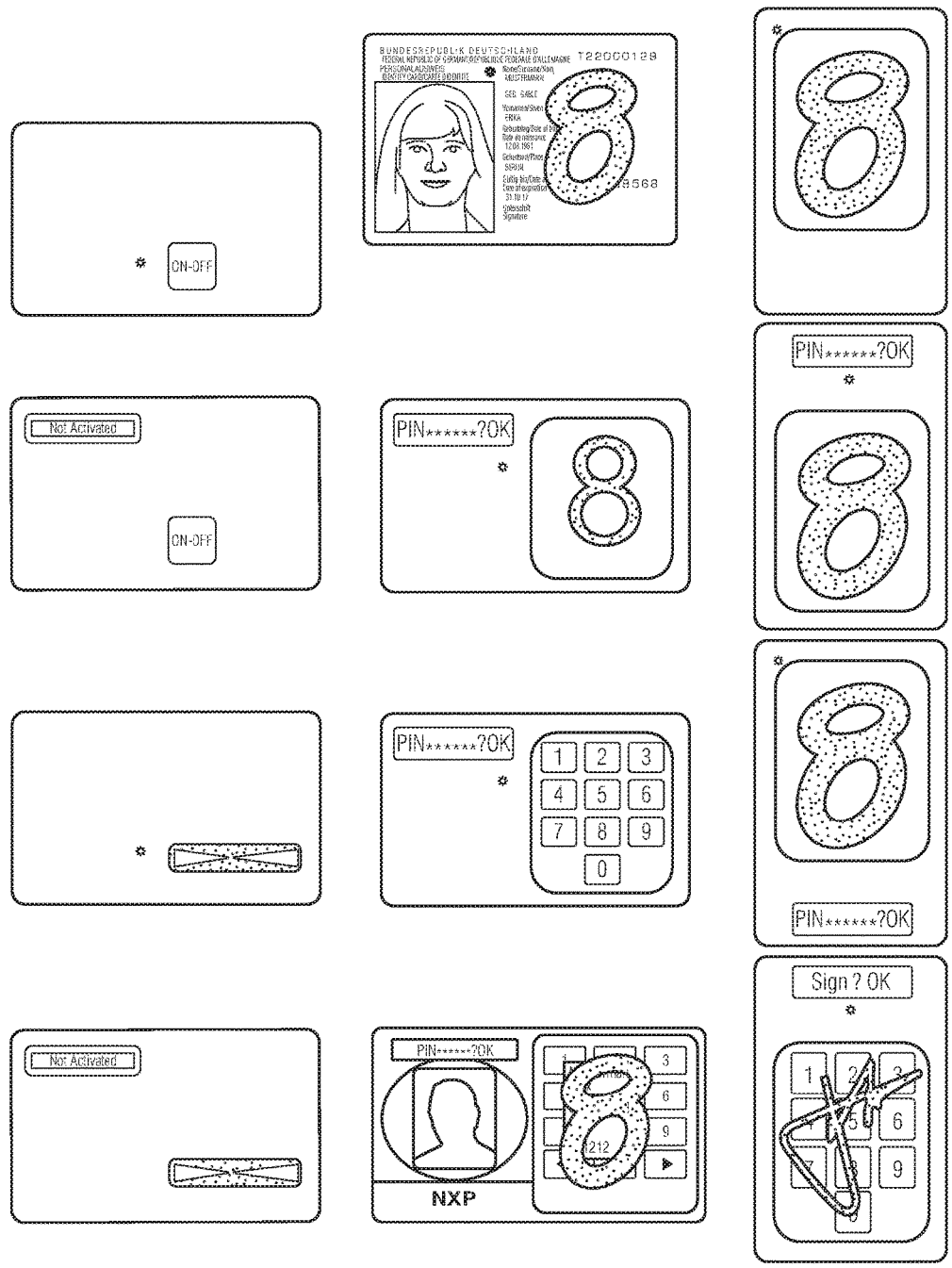
FIG. 39 is an illustration depicting possible product configurations derived from a base design.

FIG. 39 is an illustration depicting possible product configurations derived from a base design. The above-described exemplary embodiments of the invention support a simple product configuration from one base design. In particular, FIG. 39 illustrates a landscape base design (left column, middle column) and a portrait base design (right column).

Figure 40:
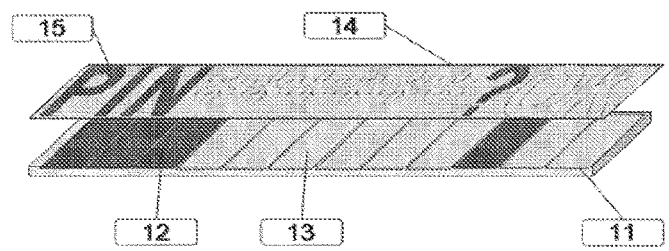
FIG. 40 is an illustration of a display configured for factory configuration by printing.

FIG. 40 is an illustration of a display configured for factory configuration by printing. Printing may be used to structure the display during document personalization. As illustrated by FIG. 40 this display structuring approach requires display elements 12, 13 on a substrate 11, which have a font height and a font width. A shadow mask 14 with the background color of the inactive display element 13 is printed over the display area. In case of an active element 12 the active display color shines through the opening in the shadow mask. In case of an inactive element the color of the shadow mask background and the inactive display element are the same.

The shadow mask 14 is applied to structure arbitrary characters. The shadow mask color may be black in case of active displays (OLED) in order to avoid light feed-through. An important benefit of the shadow mask approach results from the low requirements for display manufacturing. Resolution requirements are low resulting in extremely low clean room requirements. Standard label printing equipment can be used for display manufacturing.

According to another embodiment a printed electrochromic display is used that is redesigned according to the application requirements. If the electrochromic display is not directly printed onto a document's substrate the display has to be replaced as a component for different configurations. The hardware design of the inlay remains unchanged; only the display components are replaced by another version.

The token disclosed here has a minimum of placement requirements. The tactile pattern sensing area can completely overlay information areas of a document. Entering tactile patterns is intuitive and self-explanatory and does not require any further printing. Even an indication of the sensing area by highlighting or shading may not be required if the document structure implies a certain area for entry, as is the case with the German electronic ID-card.

Figure 41:
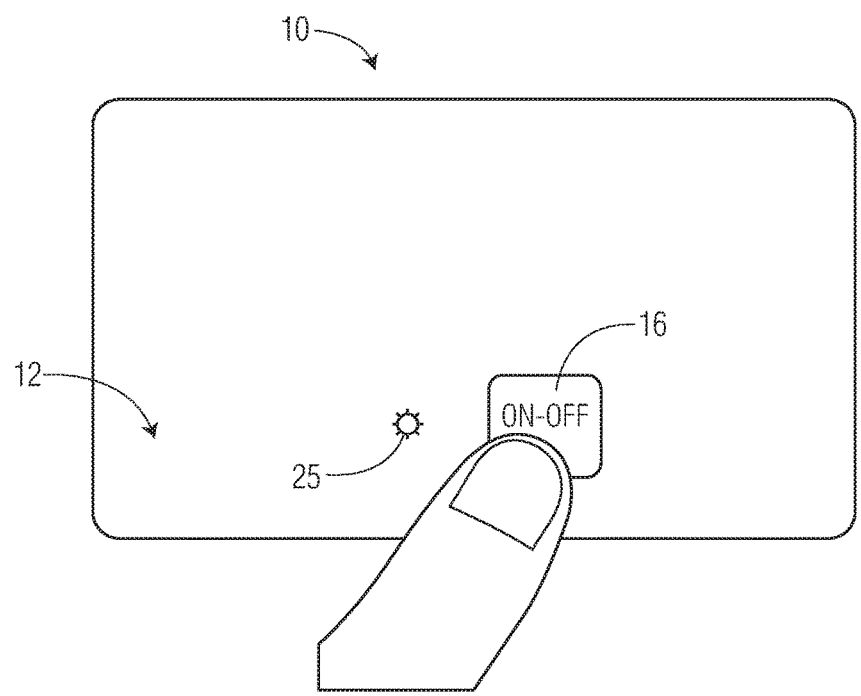
FIG. 41 is a detailed front view in accordance with another embodiment wherein the secret comprises points in time to activate or deactivate the security token and wherein the activation status is signaled.

FIG. 41 is a detailed front view in accordance with another embodiment wherein the secret comprises points in time to activate or deactivate the security token and wherein the activation status is signaled. This embodiment of the token 10 has a minimal user interface. It may be used for a user-controlled activation of an application program being executed by the first CPU 46. The secret being entered is simply the user-controlled token activation at an arbitrary point in time. To activate token 10, token 10 may be brought in close contact with an RFID interface in order to supply the token 10 with power. Power availability may be signaled by a blink of status indicator 25. When the sensing area representing button 16 is actuated by the user, a corresponding tactile pattern representing a button press of certain duration may be associated and the token 10 may be enabled to execute an application program on the first CPU 46 and to communicate via the RFID interface 44 to e.g. a PC and the status indicator 25 may be constantly turned on. When the user removes the token from the RF-field of the RFID interface, further execution of a computer program on the first CPU 46 and communication of token 10 may be disabled and the status indicator 25 may be turned off.

Figure 42:
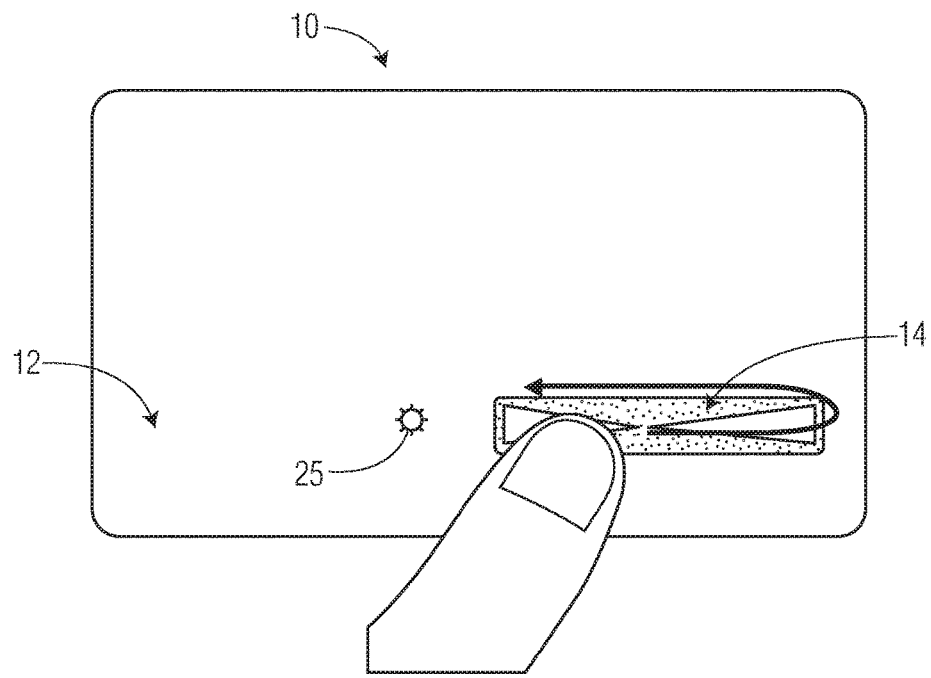
FIG. 42 is a detailed front view in accordance with another embodiment wherein the secret comprises a horizontal tactile pattern with secret dynamics and wherein the activation status is signaled.

FIG. 42 is a detailed front view in accordance with another embodiment wherein the secret comprises a horizontal tactile pattern with secret dynamics and wherein the activation status is signaled. In particular, this embodiment of the token 10 comprises a slider user interface. Again, it may be used for a user-controlled activation of an application program being executed by the first CPU 46. The secret being entered is simply the user-controlled token activation at an arbitrary point in time. To activate the token 10, the token 10 may be brought into close contact with an RFID interface in order to supply the token 10 with power. Power availability may be signaled by a blink of status indicator 25. When for example the sensing area representing slider 14 is actuated by the user's finger by making e.g. a left to right to left slide, a corresponding tactile pattern representing the slide 14 may be associated and the token 10 may be enabled to execute an application program on the first CPU 46 and may communicate via the RFID interface 44, and the status indicator 25 may be constantly turned on. When the user removes the token 10 from the RF-field of the RFID interface further execution of the application program by the first CPU 46 and communication of the token 10 may be disabled and the status indicator 25 may be turned off.

Figure 43:
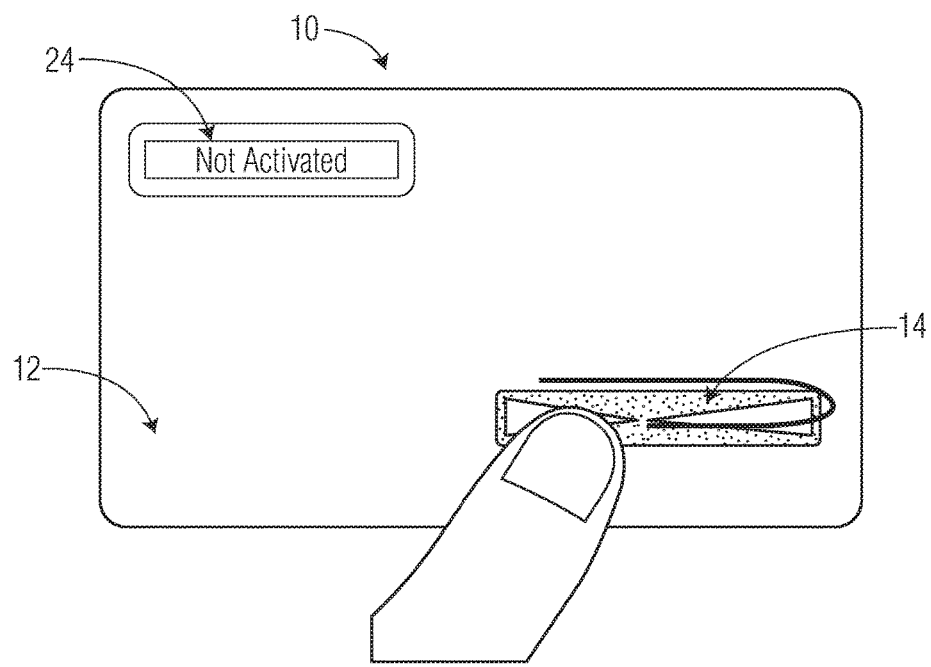
FIG. 43 is a detailed front view in accordance with another embodiment wherein the secret comprises a horizontal motion with secret dynamics and wherein the activation status is indicated by a display.

FIG. 43 is a detailed front view in accordance with another embodiment wherein the secret comprises a horizontal motion with secret dynamics and wherein the activation status is indicated by a display. In particular, it illustrates another embodiment of the token 10 comprising a slider user interface 14 and an icon display 24, but without a status indicator 25. Again, this embodiment may be used for a user-controlled activation of an application program being executed by the first CPU 46. The secret being entered may be simply the user-controlled token activation at an arbitrary point in time. To activate the token 10, the token 10 may be brought into close contact with an RFID interface in order to supply the token 10 with power. Power availability may be signaled by the display 24 indicating as an example the message "not activated".

Figure 44:
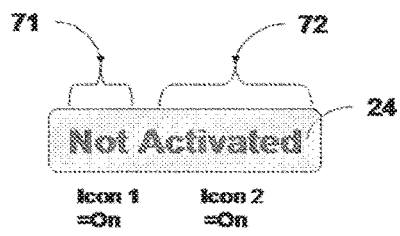
FIG. 44 is a detailed view of the display of the device in FIG. 43 in accordance with an embodiment of the invention.

FIG. 44 is a detailed view of the display of the device in FIG. 43 in accordance with an embodiment of the invention. Also, FIG. 45 is a detailed view of the display of the device in FIG. 43 in accordance with an embodiment of the invention.

In particular, FIG. 44 illustrates that the display comprises the icons "Not" 71 and "Activated" 72. When, for example, the sensing area representing slider 14 may be actuated by the user's finger by e.g. making a left to right to left slide, a corresponding tactile pattern representing the slide may be associated and the token 10 may be enabled to execute an application program on the first CPU 46 and may communicate via the RFID interface 44 and, as illustrated by FIG. 45, the icon "Not" 71 may be turned off. When the user removes the token 10 from the RF-field of the RFID interface further execution of the application program by the first CPU 46 and communication of the token 10 may be disabled and the display 24 may be completely turned off. The display as illustrated by FIG. 44 and FIG. 45 can be implemented by a printed electrochromic display or a printed OLED display.

Figure 45:
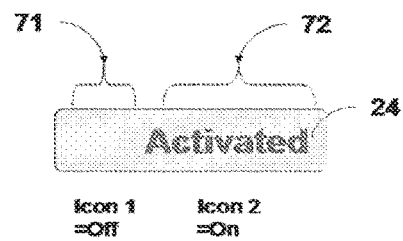
FIG. 45 is a detailed view of the display of the device in FIG. 43 in accordance with an embodiment of the invention.
Figure 46:
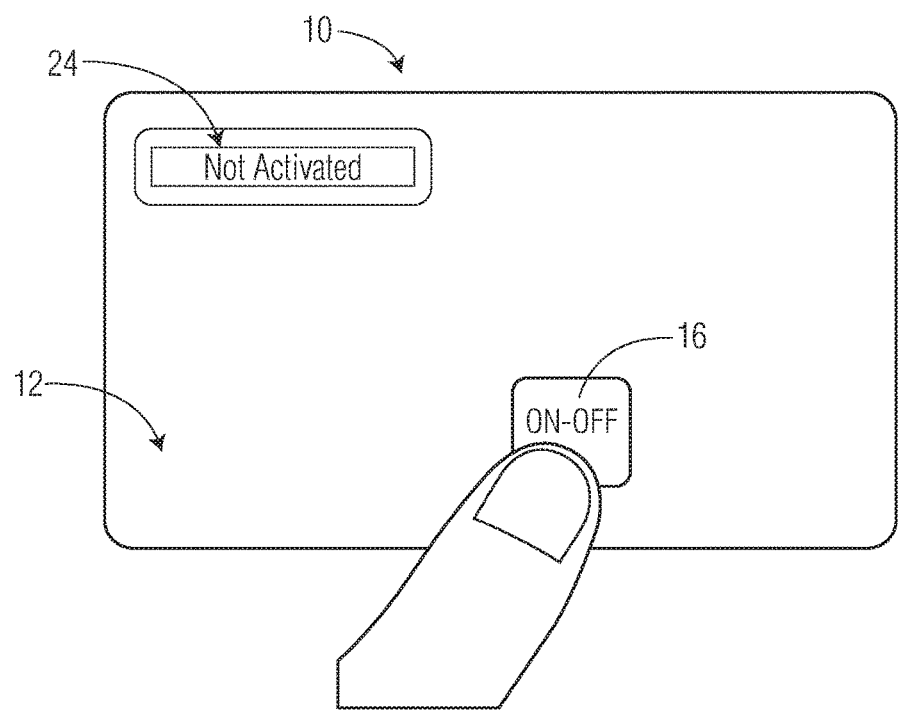
FIG. 46 is a detailed front view in accordance with another embodiment wherein the secret comprises points in time to activate or deactivate the security-token and wherein the activation status is signaled by the display indicated in FIG. 44 and FIG. 45.

FIG. 46 is a detailed front view in accordance with another embodiment wherein the secret comprises points in time to activate or deactivate the security-token and wherein the activation status is signaled by the display indicated in FIG. 44 and FIG. 45. In particular, it illustrates another embodiment of the token 10 comprising a single-button interface 16 and a display 24, but without a status indicator 25. Again, this embodiment may be used for a user-controlled activation of an application program being executed by the first CPU 46. The secret being entered may simply be the user-controlled token activation at an arbitrary point in time. In order to activate the token 10, the token 10 may be brought into close contact with an RFID interface in order to supply the token 10 with power. Power availability may be signaled by the display 24 indicating as an example the message "Not Activated". FIG. 44 and FIG. 45 illustrate that the display comprises the icons "Not" 71 and "Activated" 72. When, for example, the sensing area representing button 16 may be actuated by the user, a corresponding tactile pattern representing a button press of certain duration may be associated and the token 10 may be enabled to execute an application program on the first CPU 46. Furthermore, it may then communicate via the RFID interface 44 and, as illustrated by FIG. 45, the icon "Not" 71 may be turned off. When the user removes the token 10 from the RF-field of the RFID interface further execution of the application program by the first CPU 46 and communication of the token 10 is disabled and the display 24 is completely turned off.

Figure 47:
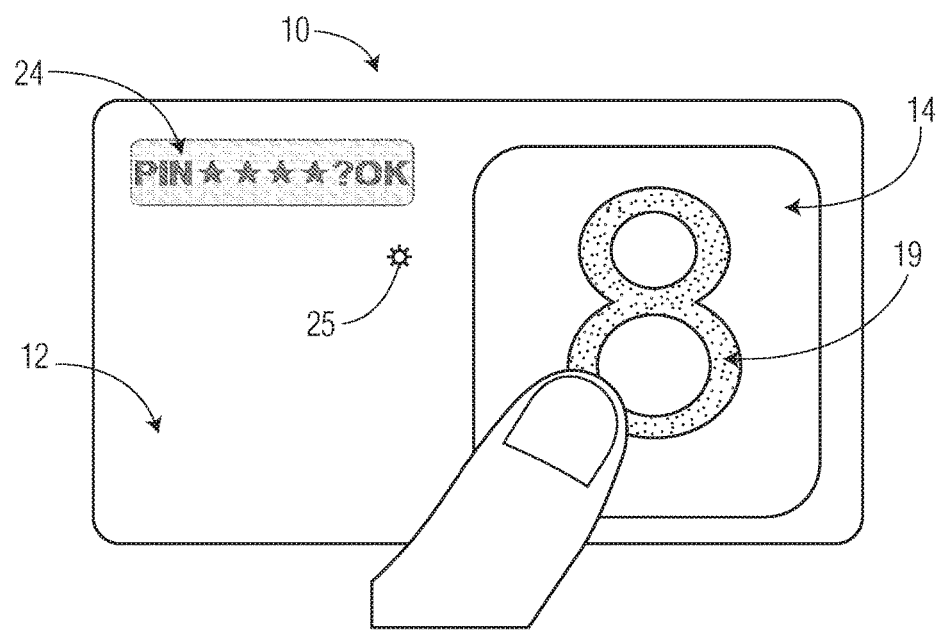
FIG. 47 is a detailed front view in accordance with another embodiment wherein the secret comprises a personal identification number that comprises a sequence of four numerical tactile patterns and wherein information guiding the user entry process is indicated on a display.
Figure 48:
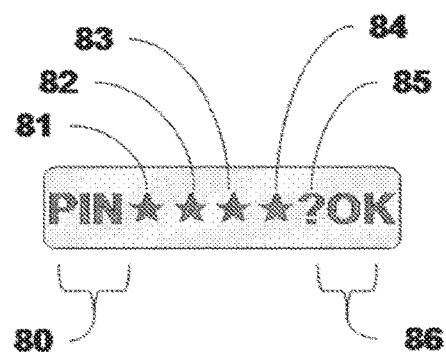
FIG. 48 is a detailed view of the display of the device in FIG. 47 in accordance with an embodiment of the invention.
Figure 49:
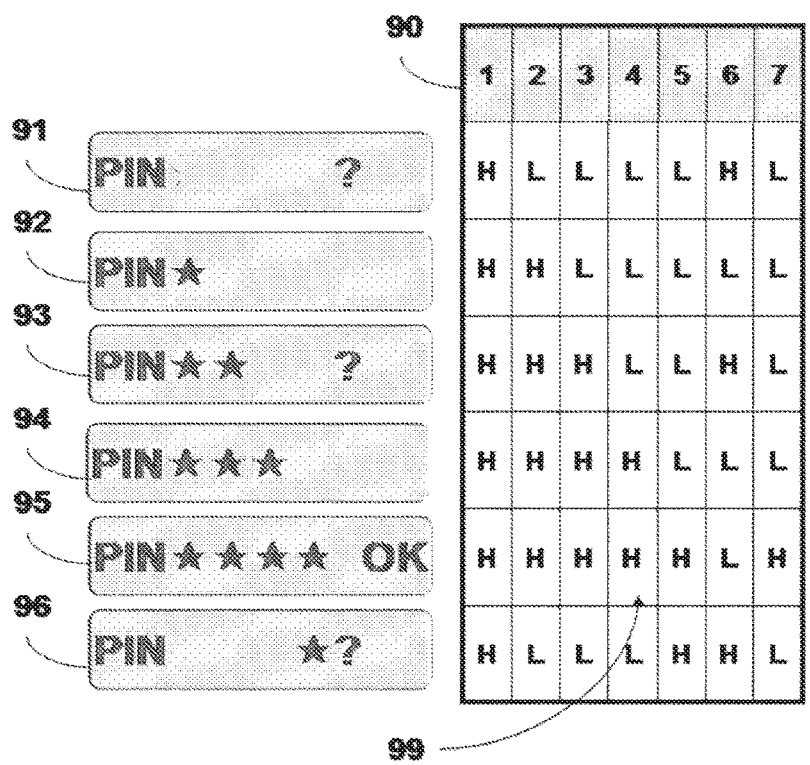
FIG. 49 is a detailed view of the display of FIG. 48 indicating various states of operation.

FIG. 47 is a detailed front view in accordance with another embodiment wherein the secret comprises a personal identification number that comprises a sequence of four numerical tactile patterns and wherein information guiding the user entry process is indicated on a display. FIG. 48 is a detailed view of the display of the device in FIG. 47 in accordance with an embodiment of the invention. FIG. 49 is a detailed view of the display of FIG. 48 indicating various states of operation.

In particular, FIG. 47 illustrates another embodiment of the token 10 comprising a two-dimensional tactile sensing interface 14, an icon display 24 and a status indicator 25. This embodiment may be used to enter a secret being, for example, a PIN code or a password comprising four characters. FIG. 48 illustrates the layout of display 24. The display icon set may comprise the icon "PIN", four star icons 81, 82, 83, 84, a "?" icon 85 and an "OK" icon 86. The messages displayed while entering the four character secret are illustrated by FIG. 49. The corresponding control signals for the icons are depicted by truth table 99.

In order to enter the secret into token 10, token 10 may be brought into close contact with an RFID interface in order to supply the token 10 with power. Power availability may be signaled by display 24 by displaying, for example, the message "PIN ?". This message may also indicate the request to start the entry of a tactile pattern sequence that represents the secret to be entered. As soon as the tactile sensor senses activity the status indicator 25 may be turned on. As an example, a first character may have been successfully associated. The token 10 may then respond by displaying message 92. A star icon without a question mark may mean that a character has been successfully associated. As an example, the second tactile pattern may not have been successfully associated by the token 10. As a consequence, message 93 may indicate a question mark icon 85, indicating that an error occurred. The user may have to re-enter the tactile pattern. Token 10 may display message 94 in case a third tactile pattern has been successfully associated. Token 10 may display message 95 in case a fourth tactile pattern has been successfully associated. The device may now have captured and successfully associated all four tactile patterns and may have verified the entered secret against a representation of the same secret stored in token 10. Message 95 also indicates a successful authentication. In case the authentication fails, message 96 may be displayed. In this case, the authentication process may start again and message 91 may be displayed.

FIG. 50 is a detailed front view in accordance with another embodiment wherein the secret comprises a personal identification number that comprises a sequence of numerical tactile patterns and wherein the tactile sensing interface is integrated into an electronic ID card and wherein status information guiding the user entry process is indicated by an optical element embedded into the document body. This exemplary embodiment of the token 10 comprises a two-dimensional tactile sensing interface 14 and a status indicator 25.

A web application may interface with the token 10 through a browser running a client-side JAVA applet that may send a command APDU via the JAVA Smartcard I/O Application Programming Interface (API) through the PC/SC-interface to the token 10 and thereby request authentication. The token 10 captures the authentication information 19 which in this case may be any combination of tactile patterns, verifies the authentication information against a secret that may be a six digit PIN stored on the token 10 and returns the verification result by a response APDU to the JAVA script, which may forward the information to the web application running on a host system.

This embodiment may be used to enter a secret that as an example may be a six-digit PIN code or a six-character password as required by the illustrated German electronic ID card. The tactile pattern entry area 14 may according to this exemplary embodiment be positioned to comply with graphical and textual boundaries of the electronic ID card. The two-dimensional tactile sensor does not interfere with any of the optical security features embedded in the documents surface and hence does not require a redesign of the security feature resulting in seamless document integration. Thus, it is possible to integrate a on-card matching functionality into existing documents.

As an example, the horizontal boundary 102 may comply with the lower boundary of the card holder image, the horizontal boundary 101 may comply with the upper boundary of the document identifier "Personalausweis", the vertical boundary 103 may comply with the horizontal start position of the card holder name, the vertical boundary 104 may comply with the horizontal right boundary of the document number. These boundaries may be regarded by users as logical boundaries that are easy to remember and do not require any additional marking of the tactile sensing area.

Figure 51:
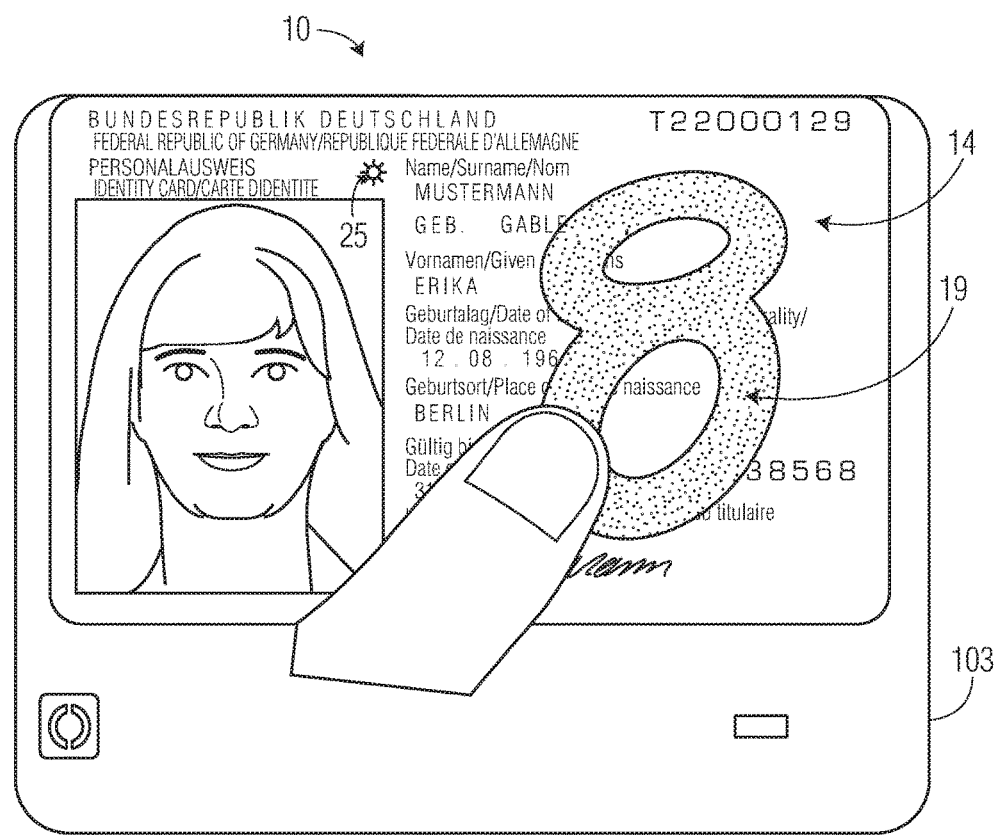
FIG. 51 is an illustration of the document displayed by FIG. 50 in conjunction with a contact-less reader device.

FIG. 51 is an illustration of the document displayed by FIG. 50 in conjunction with a contact-less reader device. FIG. 51 illustrates the token 10 being brought into close contact with an RFID reader 103 in order to supply the token 10 with power. A status indicator 25 embedded into the token 10 and configured to shine through the tokens surface may indicate availability of power by a short blink. When, for example, a tactile pattern 19 is sensed, the status indicator 25 may be constantly turned on. The token 10 may send status information through the browser plug-in to the browser application and the browser may display the status information on the screen. The status information may indicate whether a tactile pattern has been associated or that a tactile pattern has not been associated. The entry of another tactile pattern may also be requested. When all tactile patterns forming the password have been associated, the token 10 verifies the password against a representation of the same password stored in token 10 and returns an encrypted message through the browser plug-in to the server application in order to conclude the authentication process.

Figure 52:
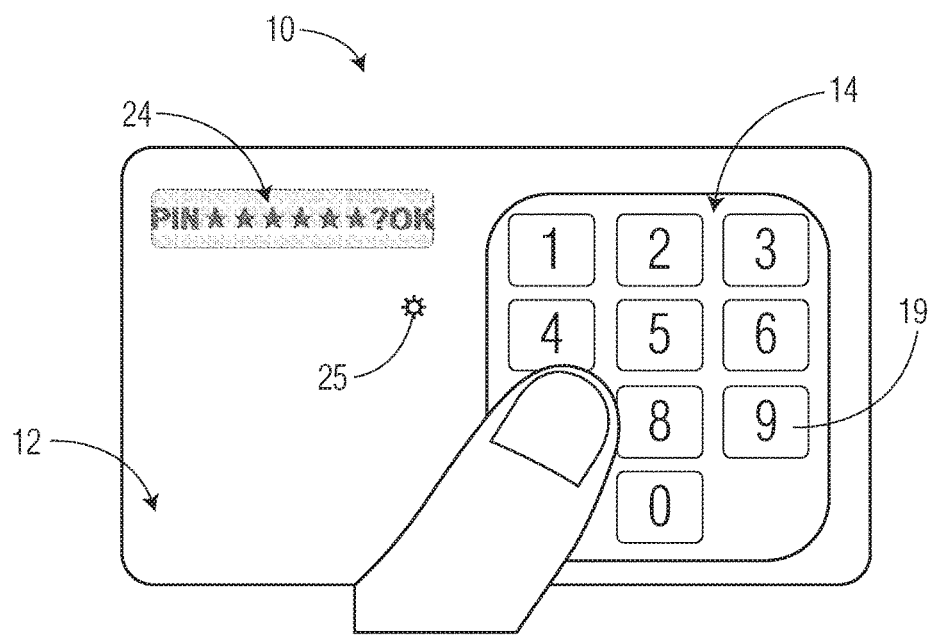
FIG. 52 is a detailed front view in accordance with another embodiment wherein the secret comprises a personal identification number that is composed by a sequence of six position selection tactile patterns and wherein user guidance is indicated on a display.
Figure 53:
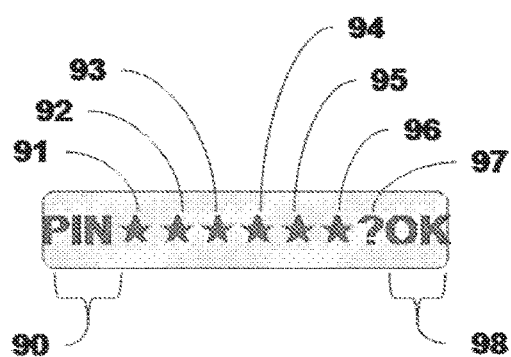
FIG. 53 is a detailed front view of another iconized display in accordance with the display of FIG. 52.
Figures 54, 55:
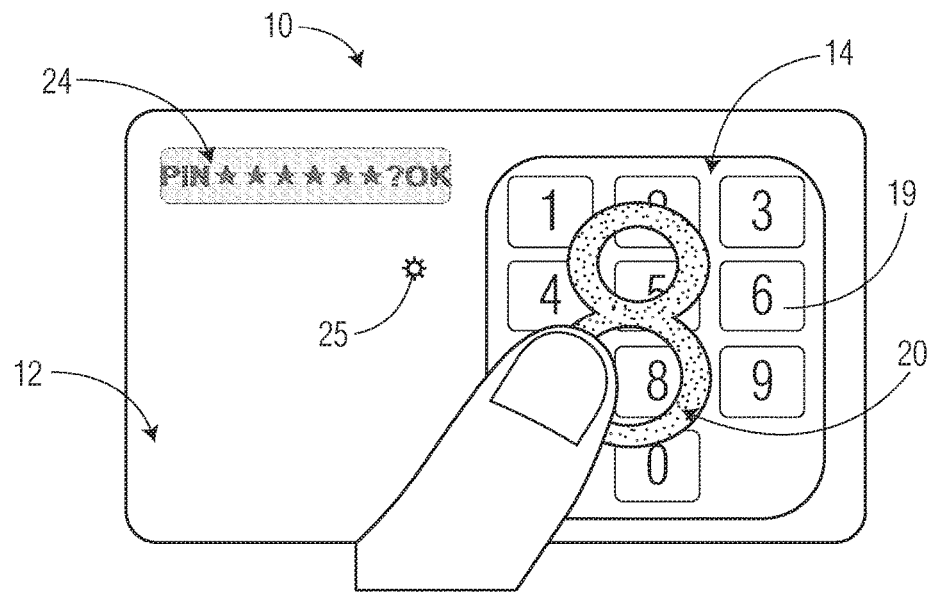
FIG. 54 is a detailed front view of another iconized display in accordance with the display of FIG. 52.
FIG. 55 is a detailed front view in accordance with another embodiment wherein the secret comprises a personal identification number that is composed of a sequence of six numbers that may be represented either by position selection tactile patterns or by numerical tactile patterns and wherein user guidance is indicated on a display.

FIG. 52 is a detailed front view in accordance with another embodiment wherein the secret comprises a personal identification number that is composed by a sequence of six position selection tactile patterns and wherein user guidance is indicated on a display. FIG. 53 is a detailed front view of another iconized display in accordance with the display of FIG. 52. FIG. 54 is a detailed front view of another iconized display in accordance with the display of FIG. 52.

FIG. 52 illustrates another embodiment of the token 10 comprising a two-dimensional tactile sensing interface 14 with a key-pad layout, an iconized display 24 and a status indicator 25. This embodiment may be used to enter a secret that for example consists of a PIN code comprising six characters. FIG. 53 illustrates the layout of the iconized display 24. The display icon set may comprise the icons "PIN" 90, six stars 91, 92, 93, 94, 95, 96, a "?" icon 97 and an "OK" icon 98. The messages that may be displayed while entering the six-character secret follow the same principle as illustrated by FIG. 49 for the four-character secret. In order to enter the secret into the token 10, the token 10 may be brought into close contact with an RFID interface in order to supply the token 10 with power. Power availability may be signaled by the display 24 that may indicate as an example the message "PIN ?". This message may also indicate the request to start the entry of a button-press sequence representing the secret to be entered. When the token 10 may have captured and associated all six tactile patterns representing button presses and may have verified the entered secret against a representation of the same secret stored in the token 10 the message illustrated by FIG. 54 may be displayed, which indicates a successful authentication.

An application area of this embodiment may be the activation of time-shared software licenses wherein the software licenses are centrally allocated to a user who authenticates towards a computer using the token 10 in order to gain access to production software. When the token 10 is removed from the RFID interface the duration of the software utilization is centrally captured. For example, a company card can be used to enable time-shared software. This enables new business models based on a company card. Software licenses may be allocated by a central service. If a user logs in and authenticates by means of the company card, the related software licenses will become available.

FIG. 55 is a detailed front view in accordance with another embodiment wherein the secret comprises a personal identification number that is composed of a sequence of six numbers that may be represented either by position-selection tactile patterns or by numerical tactile patterns and wherein user guidance is indicated on a display. In particular, it illustrates another exemplary embodiment of the token 10 comprising a two-dimensional tactile sensing interface 14 with a combined layout for tactile pattern capture and a key-pad function, an iconized display 24 and a status indicator 25. This embodiment may be used to enter a secret that for example consists of a PIN code or a password comprising six characters. FIG. 53 illustrates the layout of the display 24. The display icon set may comprise the icons "PIN" 90, six stars 91, 92, 93, 94, 95, 96, a "?" icon 97 and an "OK" icon 98. The messages displayed while entering the six-character secret follow the same principle as illustrated by FIG. 49 for the four-character secret. In order to enter the secret into the token 10, the token 10 may be brought into close contact with an RFID interface in order to supply token 10 with power. Power availability may be signaled by the display 24 that may indicate as an example the message "PIN ?". This message may also indicate the request to start the entry of a sequence of button presses 19 and/or tactile patterns 20 representing the secret to be entered. When the token 10 has captured and associated all six tactile patterns representing button presses and/or digits of the password and when the token 10 has verified the entered secret against a representation of the same secret stored in the token 10, the message illustrated by FIG. 54 may be displayed, which indicates a successful authentication.

Figure 56:
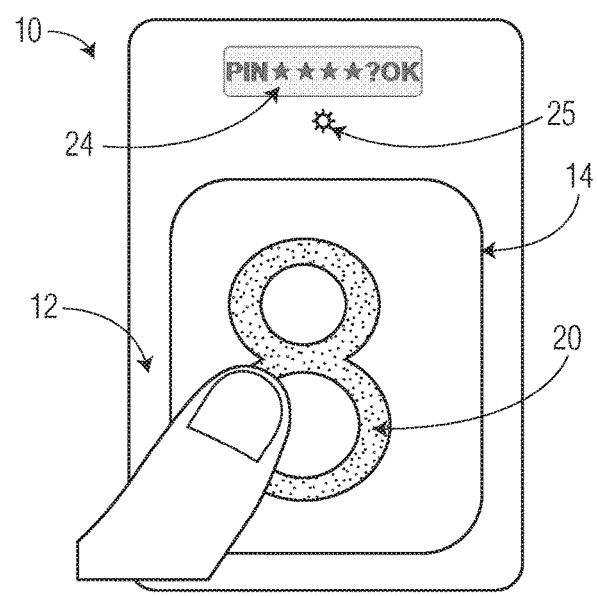
FIG. 56 is a detailed front view in accordance with another embodiment wherein the secret comprises a personal identification number that is composed of a sequence of four numbers and wherein user guidance is indicated on a display and wherein the security token has a portrait format and wherein the display is positioned on the top of the token.

FIG. 56 is a detailed front view in accordance with another embodiment wherein the secret comprises a personal identification number that is composed of a sequence of four numbers and wherein user guidance is indicated on a display and wherein the security token has a portrait format and wherein the display is positioned on the top of the token. In particular, it illustrates another embodiment of the token 10, which is similar to the embodiment illustrated by FIG. 47, but with a portrait form factor instead of a landscape form factor and configured to capture a four-character secret. This portrait form factor offers the possibility to implement a larger tactile sensing area.

Figure 57:
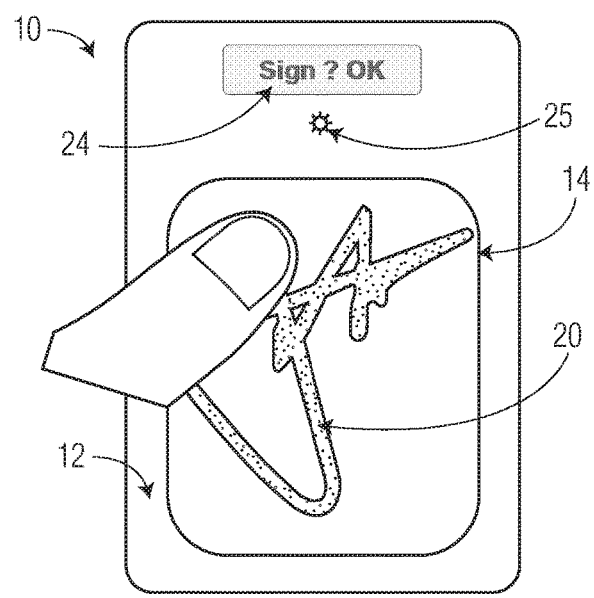
FIG. 57 is a detailed front view in accordance with another embodiment wherein the secret comprises a signature short-cut and wherein user guidance is indicated on a display and wherein the security token has a portrait format and wherein the display is positioned on the top of the token.

FIG. 57 is a detailed front view in accordance with another embodiment wherein the secret comprises a signature short-cut and wherein user guidance is indicated on a display and wherein the security token has a portrait format and wherein the display is positioned on the top of the token. In particular, it illustrates another embodiment of the token 10, which is configured to capture a signature short-cut secret. An application area of this kind of token 10 may be less security-relevant payment applications, e.g. canteen payment of amounts that require a certain degree of authentication.

Figure 58:
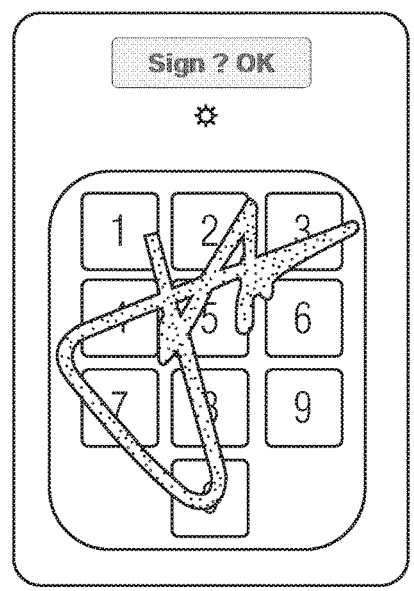
FIG. 58 is a detailed front view in accordance with another embodiment wherein the secret comprises a signature short-cut or a combination of key presses on a keypad and wherein user guidance is indicated on a display and wherein the security token has a portrait format and wherein the display is positioned on the top of the token.

FIG. 58 is a detailed front view in accordance with another embodiment wherein the secret comprises a signature short-cut or a combination of key presses on a keypad and wherein user guidance is indicated on a display and wherein the security token has a portrait format and wherein the display is positioned on the top of the token. In particular, it illustrates another embodiment of the token 10, which is similar to the embodiment illustrated by FIG. 57, and which is configured to capture a signature short-cut secret. In addition, it comprises a keypad for PIN entry. An application area of this kind of token 10 may be less security-relevant payment applications, e.g. canteen payment of amounts that require a certain degree of authentication.

Figure 59:
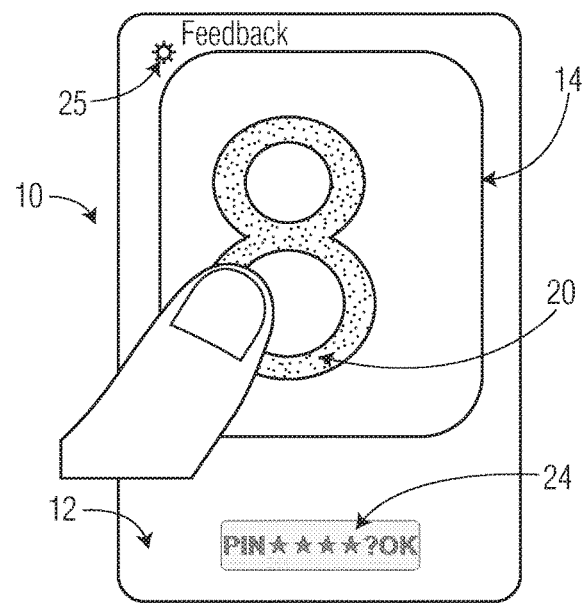
FIG. 59 is a detailed front view in accordance with another embodiment wherein the secret comprises a personal identification number that is composed of a sequence of four numbers and wherein user guidance is indicated on a display and wherein the security token has a portrait format and wherein the display is positioned at the bottom of the token.

FIG. 59 is a detailed front view in accordance with another embodiment wherein the secret comprises a personal identification number that is composed of a sequence of four numbers and wherein user guidance is indicated on a display and wherein the security token has a portrait format and wherein the display is positioned at the bottom of the token. In particular, it illustrates another embodiment of the token 10 having a display positioned at the bottom and configured to capture a four-character secret. An application area of this kind of token 10 may be authentication for machines or devices where the token 10 needs to be fixed vertically during entry of the secret.

Figure 60:
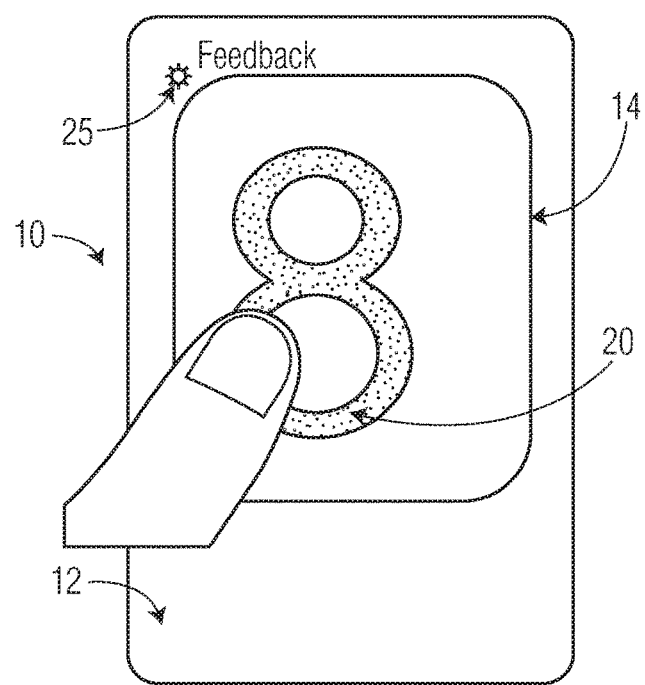
FIG. 60 is a detailed front view in accordance with another embodiment wherein the secret comprises a personal identification number that is composed of an arbitrary sequence of numbers and wherein no display is provided and wherein the token has a portrait format and wherein a status indicator is provided.

FIG. 60 is a detailed front view in accordance with another embodiment wherein the secret comprises a personal identification number that is composed of an arbitrary sequence of numbers and wherein no display is provided and wherein the token has a portrait format and wherein a status indicator is provided. In particular, it illustrates another embodiment of the token 10 which is configured to capture a secret comprising an arbitrary amount of characters, but without having a display. A display connected to a host application is used to provide feedback. An application area of this kind of token 10 may be authentication procedures for machines or devices where the token 10 needs to be fixed vertically during entry of the secret and the authentication status information is displayed on the machine or device display.

Figure 61:
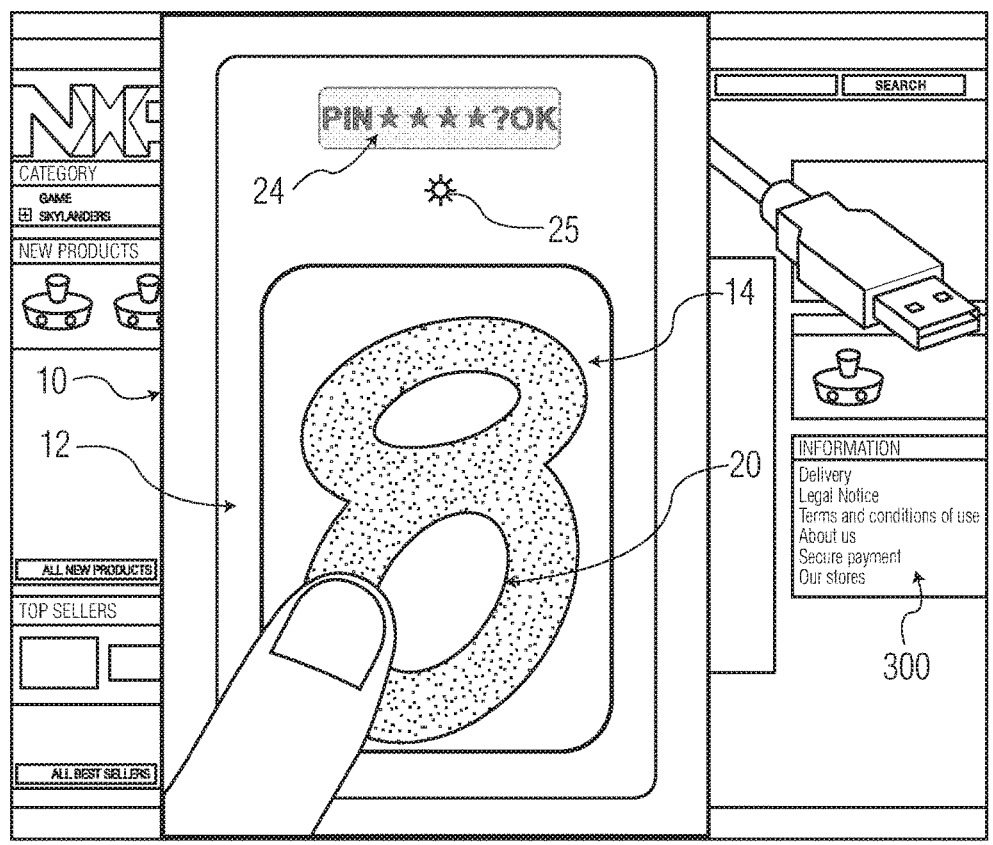
FIG. 61 is a detailed front view in accordance with another embodiment illustrating a web-based online transaction comprising a token with tactile sensor interface.

FIG. 61 is a detailed front view in accordance with another embodiment illustrating a web-based online transaction comprising a token with tactile sensor interface. In particular, it illustrates the token 10 attached to a contact-less RFID reader. The reader may be connected by means of a USB connection to a laptop that may run a web-browser browsing a web page with a shopping application 300, for example. The shopping application may indicate a check-out and the user may receive the request to authenticate a shopping transaction by entering secure authentication information. The user may enter the authentication information 20 composed in this example by a four-digit PIN as a sequence of tactile patterns via the tactile sensor 14. The display 24 may give guiding feedback on the authentication progress. When the PIN may be completely entered it may be transferred through a browser plug-in to the payment module of the shopping application 300 and the transaction may be executed.

FIG. 62 is a detailed front view of a Smartphone. FIG. 63 is an illustration of the Smartphone of FIG. 62 performing authentication for an online transaction comprising a security token with tactile sensor interface according to an embodiment of the invention. FIG. 62 and FIG. 63 illustrate the token 10 being attached to a Smartphone 111 equipped with an NFC interface. A browser plug-in or a JAVA applet may enable access to the NFC interface and may enable authentication of an online payment application through the token 10. As an example the token 10 may be configured to enter a four-character password. A request to attach the token 10 and to enter the authentication information may be displayed by message 112 on the SmartPhone's screen 113. The user may then attach the token 10 to the SmartPhone 111. The token 10 may be powered up through the SmartPhone's NFC interface. Power availability may be signaled by the indicator 25. The user may now enter the required authentication information by a sequence of tactile patterns directly on the surface of the token 10. The authentication information may be reassembled by the tactile pattern decoding of the token 10 based on the sequence of tactile patterns entered by the user. The authentication information may be verified directly on the token 10 by its security controller and the verification result may be returned encrypted to the browser plug-in on the Smartphone 111. As an alternative approach the authentication information may be sent in encrypted format through a browser plug-in directly to a remote service for decryption and verification. The user may utilize his personal authentication token 10 without running into danger that secret information might be logged by an unauthorized process on the Smartphone. The encrypted verification result may be decrypted by the remote service. In this context the token 10 may act as a security proxy that adds security to a non-secure communication device.

FIG. 64 is an illustration of the Smartphone similar to FIG. 63 performing authentication for an online transaction comprising an electronic ID card with a tactile sensor interface according to an embodiment of the invention. The application illustrated by FIG. 64 is similar to FIG. 63. In this exemplary embodiment the token 10 is an electronic ID card with an embedded tactile sensor 14 which may be used as a security proxy. The sensor embedded in the document does not interfere with any of the document's optical security features. This approach clearly results in a low-effort implementation. The ID1 card format is compatible with a Smartphone 111 in landscape format. The combination of Smartphone and ID1 document is very handy and the tactile pattern may be entered quite easily. A minimal amount of guidance may be given by the embedded optical feedback 25 which may be an embedded low-profile LED shining through the document's top layer.

Figure 65:
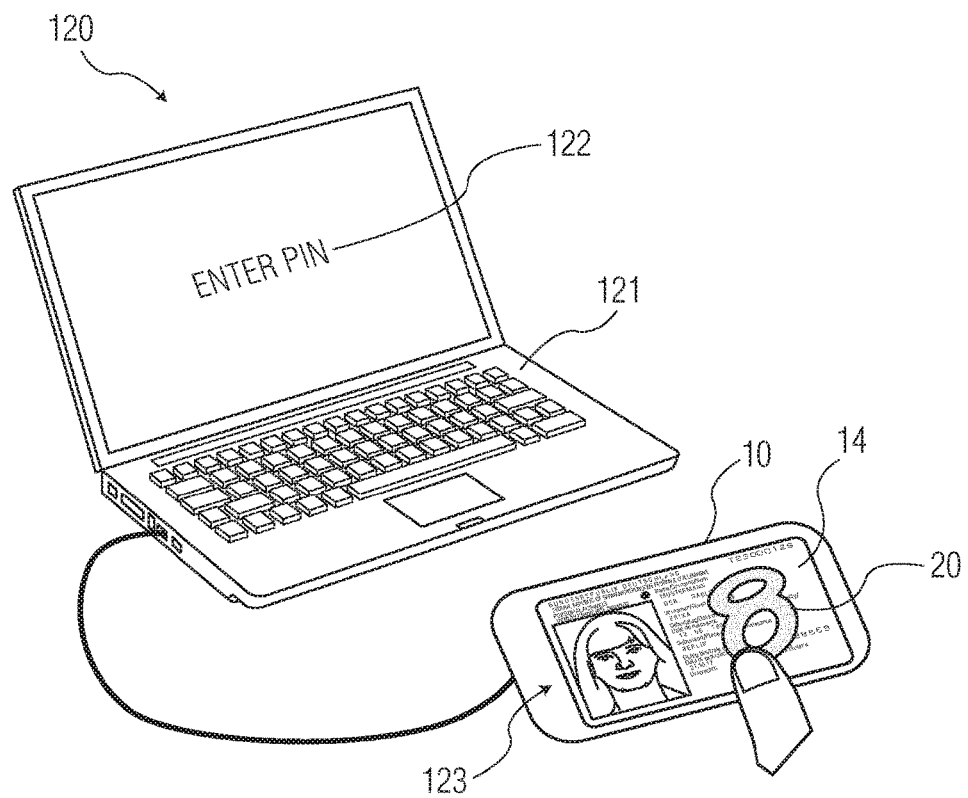
FIG. 65 is an illustration of an online transaction involving authentication through an electronic ID card comprising a tactile sensor interface according to an embodiment of the invention.

FIG. 65 is an illustration of an online transaction involving authentication through an electronic ID card comprising a tactile sensor interface according to an embodiment of the invention. In particular, it illustrates an authentication process based on the token 10 configured as an electronic Identity Card (German ID Card). The token 10 may be attached to a non-secure contact-less reader 123. The reader 123 may be attached to a laptop 121 browsing an official web page that requests authentication. A browser plug-in or a JAVA applet may enable APDU access to the token 10. As an example the token 10 may be configured to enter a four-character password on a two-dimensional sensing area 14. The tactile patterns 20 may be associated and the resulting password may be verified directly on the token 10 by its first CPU 46 and the verification result may be returned in encrypted form through the browser plug-in or JAVA applet to the service that requested the authentication. In this setup the laptop screen may be used to give status feedback to the user. Advantageously, the status feedback is void of private information.

Figure 66:
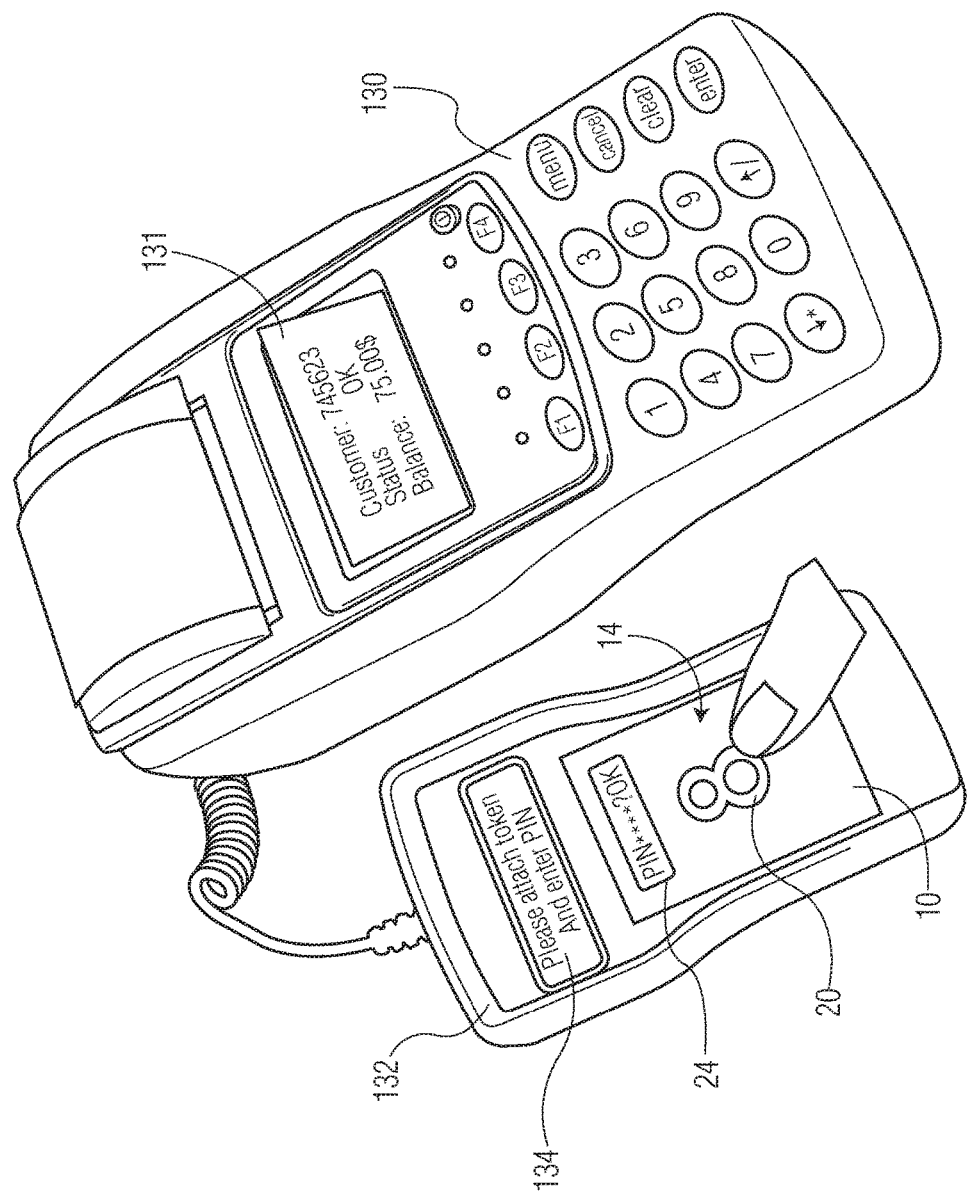
FIG. 66 is an illustration of a POS transaction involving authentication through an electronic ID card comprising a tactile sensor interface according to an embodiment of the invention.

FIG. 66 is an illustration of a POS transaction involving authentication through an electronic ID card comprising a tactile sensor interface according to an embodiment of the invention. In particular, it illustrates an authentication process based on the token 10 configured as an electronic payment card. The token 10 may be attached to a contact-less reader 132. The reader 132 may be attached to a point-of-sales (POS) terminal that may request authentication. As an example the token 10 may be configured to enable a user to enter a four-character password on a two-dimensional sensing area 14. The tactile patterns 20 may then be associated and the resulting password may be verified directly on the token 10 by its first CPU 46 and the verification result may be returned in encrypted form through the POS-terminal to the payment service. In this setup the token 10 may comprise a display to be able to interface with a large variety of POS-terminals.

Figure 67:
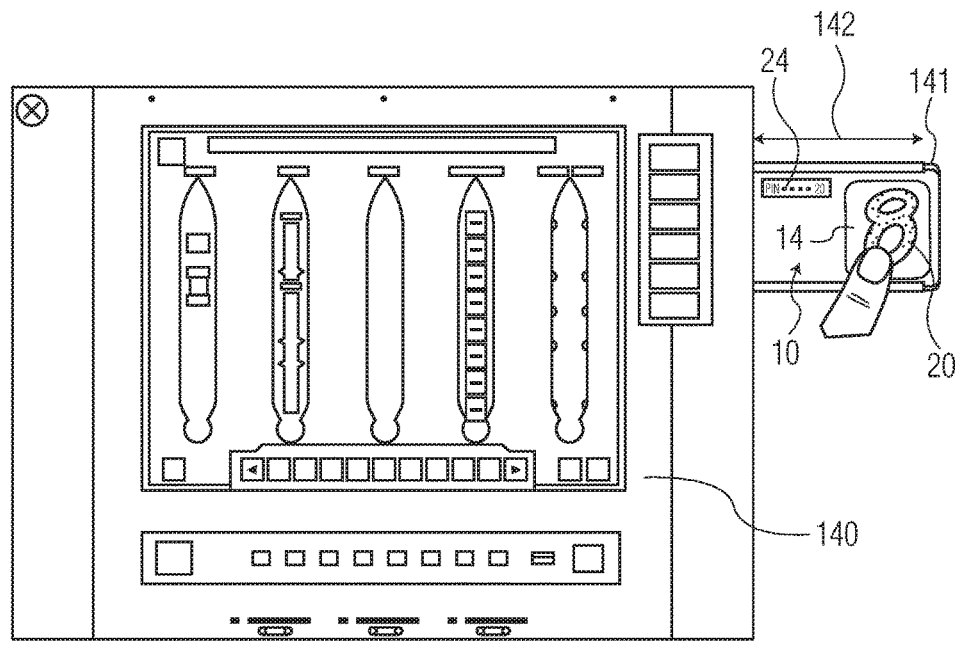
FIG. 67 is an illustration of an authentication process requested by an Airbus Flight Attendant Panel through a security token comprising a tactile sensor interface according to an embodiment of the invention.

FIG. 67 is an illustration of an authentication process requested by an Airbus Flight Attendant Panel through a security token comprising a tactile sensor interface according to an embodiment of the invention. In particular, it illustrates a machine authentication. In this example access to a flight attendant panel (FAP) 140 may be restricted. Functions on the plane may be controlled by access rights. Not all flight crew members may have access to electricity control or other control applications, for example. The airline may store the access rights on the crew member cards. The same applies to maintenance staff that may be temporarily entitled to get access to certain functions on the plane. The FAP 140 may not have any sharp corners; for that reason a contact-less reader interface may be implemented on a slider 141 that may be extracted by a push on the slider. The token 10 may be configured to capture a four-character password and to verify the password against the password stored within the token 10. The verification result including the access right information may be communicated to the FAP.

Figure 68:
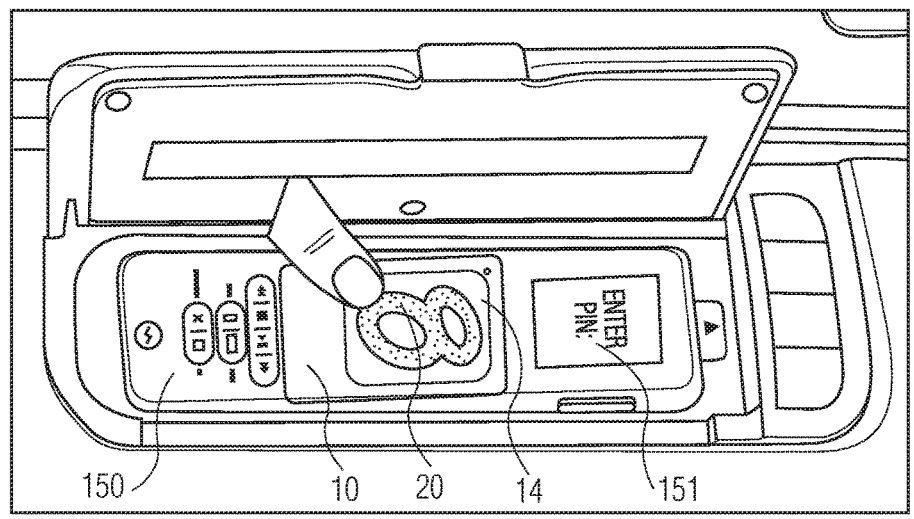
FIG. 68 is an illustration of an in-flight payment application involving authentication through an electronic ID card comprising a tactile sensor interface according to an embodiment of the invention.

FIG. 68 is an illustration of an in-flight payment application involving authentication through an electronic ID card comprising a tactile sensor interface according to an embodiment of the invention. In particular, it illustrates an on-flight payment application with the token 10 being configured to capture an arbitrary sequence of tactile patterns, which may enable international use. The token 10 may communicate with a contact-less-reader built into the flight entertainment panel 150. The authentication process may utilize the display of the flight entertainment system for status feedback in order to satisfy all localization requirements. The passenger may be requested to enter his authentication information 20 on the two-dimensional tactile sensing area 14. The password may be obtained after successful association and verified within the secure environment of the first CPU 46 against the password copy. The verification result may be communicated in encrypted form to the payment module within the in-flight entertainment system.

Figure 69:
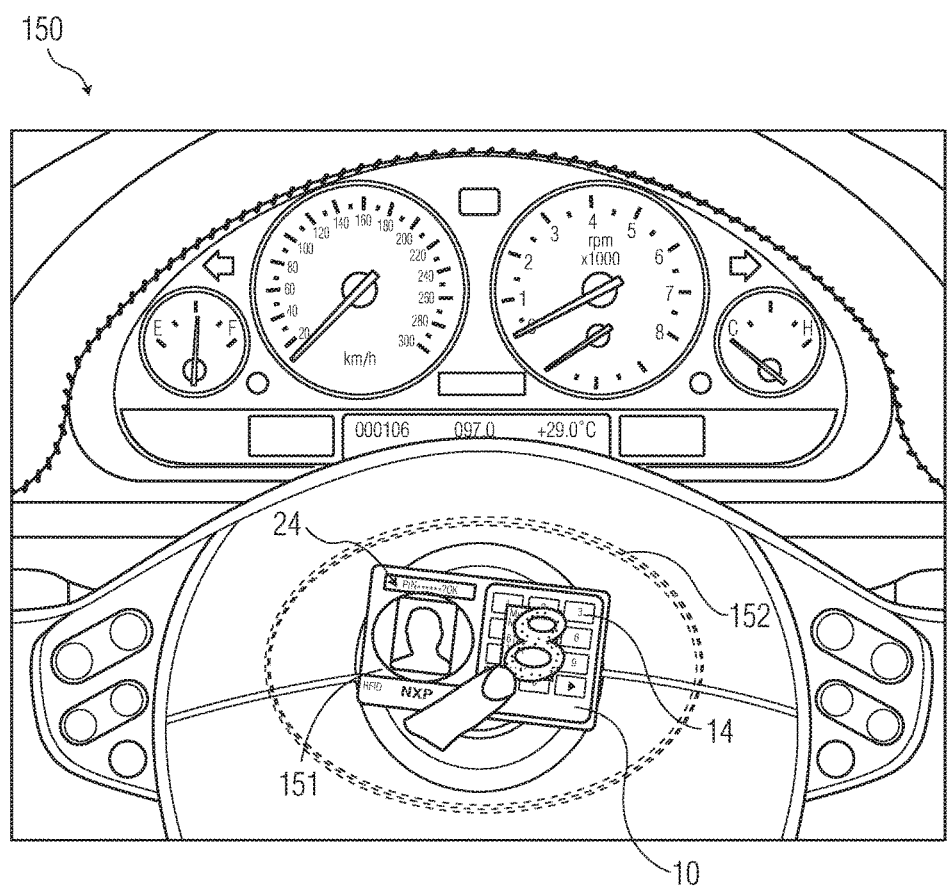
FIG. 69 is an illustration of a vehicle-based application involving authentication through an electronic ID card comprising a tactile sensor interface according to an embodiment of the invention.

FIG. 69 is an illustration of a vehicle-based application involving authentication through an electronic ID card comprising a tactile sensor interface according to an embodiment of the invention. In particular, it illustrates a vehicle access authentication process for restricting access to a car, for example. Special car functions, e.g. of a rental car or of a family car, may be controlled by access rights. Not all drivers may have access to certain security-relevant or comfort applications. A car rental agency may store access rights on the token 10 which may be a membership card in this case. The same applies to maintenance staff that may be temporarily entitled to get access to certain functions of the car. Communication may be implemented through a loop antenna 152 underneath the steering wheel that may be connected to a contact-less reader device, for example.

Figure 70:
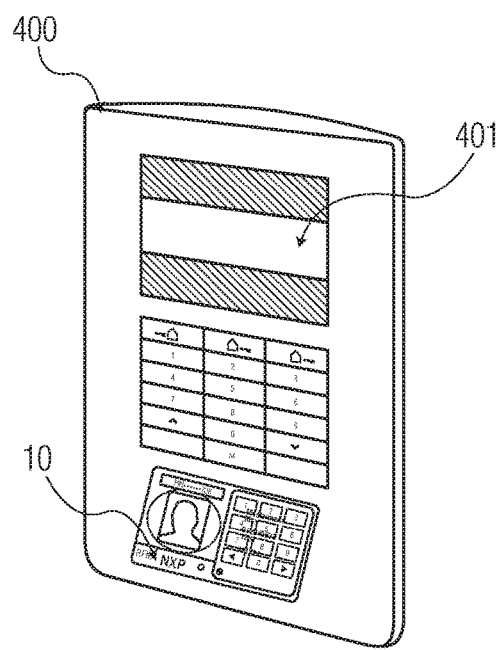
FIG. 70 is a detailed view of a company access system with an interactive company card used for login.
Figure 71:
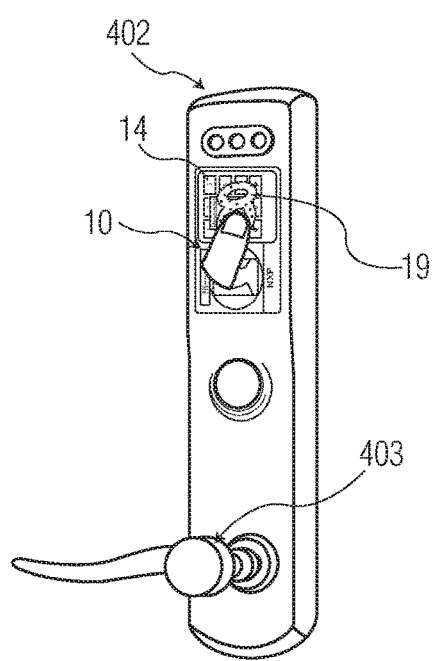
FIG. 71 is a detailed view of a security lock together with an interactive company card for restricted area authentication.

FIG. 70 is a detailed view of a company access system with an interactive company card used for login. FIG. 71 is a detailed view of a security lock together with an interactive company card for restricted area authentication. FIG. 70 and FIG. 71 illustrate a company access system 400 where the user may login using his token 10, which is an interactive company card in this case. After login at the gate the user may gain access to a building, for example. Different access rights within a building may be assigned to the user. When the user requests access to a restricted area he may have to authenticate at the lock 402 using his token 10 by e.g. entering a sequence of tactile patterns representing a PIN directly via the tactile sensor 14 of the token 10. Upon successful authentication the lock may release handle 403 and the door may be opened. In the example depicted by FIG. 71 the display is not used. It may also be feasible to attach the token 10 in landscape mode and to use the display for authentication feedback.

Figure 72:
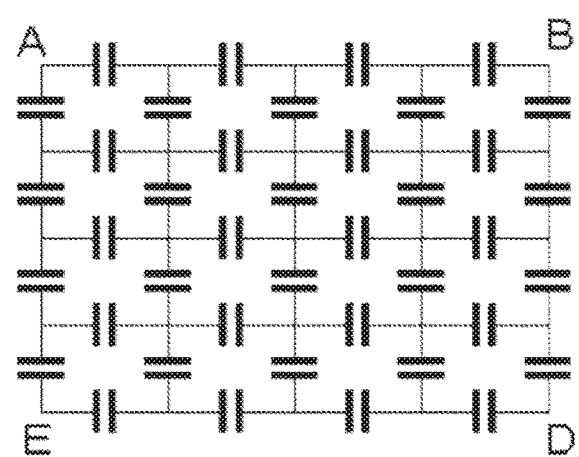
FIG. 72 illustrates a tactile sensing user interface which comprises a mesh network of proximity sensing capacitors.

FIG. 72 illustrates a tactile sensing user interface which comprises a mesh network of proximity sensing capacitors. FIG. 72 indicates a different implementation of the proximity sensing capacitors. In this configuration the capacitance is measured between one of the nodes A, B, C, D and the other three nodes. The capacitance measurement is performed multiple times such that each time another of the four nodes A, B, C, D is involved as the single node and a touch position is calculated from the measurement results. This configuration has the benefit that only two, three or four integration intervals are required for one position data determination. In practice this approach allows a reduction of I/O-lines from 10 to a maximum of 4.

The above-mentioned embodiments illustrate rather than limit the invention, and the skilled person will be able to design many alternative embodiments without departing from the scope of the appended claims. In the claims, any reference sign placed between parentheses shall not be construed as limiting the claim. The word "comprise(s)" or "comprising" does not exclude the presence of elements or steps other than those listed in a claim. The word "a" or "an" preceding an element does not exclude the presence of a plurality of such elements. The invention may be implemented by means of hardware comprising several distinct elements and/or by means of a suitably programmed processor. In a device claim enumerating several means, several of these means may be embodied by one and the same item of hardware. The mere fact that certain measures are recited in mutually different dependent claims does not indicate that a combination of these measures cannot be used to advantage.

The invention claimed is:

1. A security token comprising:
   a tactile sensing user interface being configured to receive a user-encoded secret, wherein the user-encoded secret is a tactile symbol, and the tactile sensing user interface is configured to capture tactile patterns and provide a tactile pattern data stream which represents the tactile symbol and comprises a sequence of said tactile patterns to the decoding unit;
   a decoding unit configured to generate a decoded secret by decoding the user-encoded secret and by applying a private inverse transfer function to the tactile pattern data stream, wherein the private inverse transfer function is an inverse of a private transfer function applied by the user to encode the tactile symbol;
   a comparison unit being configured to compare the decoded secret with a copy of the user-encoded secret stored in the security token in order to verify authenticity of the user;
   and a release foil with printed tactile key information configured to define the private inverse transfer function.

2. The security token as claimed in claim 1, wherein the private inverse transfer function is definable by the user via the tactile sensing user interface in a configuration mode of the security token.

3. The security token as claimed in claim 2, wherein the private inverse transfer function further reflects user-specific tactile pattern deviations captured by the tactile sensing user interface in the configuration mode of the security token, such that entropy of the user-encoded secret is increased.

4. The security token as claimed in claim 2, wherein the private inverse transfer function further reflects sensordevice-specific tactile pattern deviations applied by the tactile sensing user interface in the configuration mode of the security token, such that entropy of the user-encoded secret is increased.

5. The security token as claimed in claim 1, wherein the tactile sensing user interface comprises:
an array of proximity sensors or mechanical pressure sensors.

6. The security token as claimed in claim 1, wherein the tactile sensing user interface comprises:
a mesh network of proximity sensing capacitors.

7. The security token as claimed in claim 5, wherein the proximity sensors comprise one of a group of proximity sensing capacitors, proximity sensing resistors, surface acoustic wave sensors, infra-red light sources, and optical receivers.

8. The security token as claimed in claim 7, further comprising:
a compressible layer on which an array of proximity sensing capacitors is mounted; and
counter-electrodes underneath the compressible layer, wherein said counter-electrodes form pressure-dependent capacitances with the array of the proximity sensing capacitors.

9. The security token as claimed in claim 5, further comprising:
button functions assigned to sub-areas of an area covered by the array of the proximity sensors or the mechanical pressure sensors; and
a surface print design which provides a visual overview of said button functions.

10. The security token as claimed in claim 1, wherein the tactile symbol comprises a personal identification number, the private inverse transfer function translates elements of a user-defined character repertoire to digits of the personal identification number, and the user-defined character repertoire comprises at least one of a group of: alphanumeric character tactile patterns corresponding to said digits, key position tactile patterns corresponding to said digits, and graphical symbol tactile patterns corresponding to said digits.

11. The security token as claimed in claim 1, wherein the tactile symbol comprises a signature short-cut and the private inverse transfer function decodes a tactile pattern which represents said signature short-cut.

12. The security token as claimed in claim 1, further comprising at least one of a group of: a feedback indicator, a status indicator, a display, and an audio output.

13. The security token as claimed in claim 1, further comprising a display, the display comprising at least one of a group of: icons, segments, and active areas that have been structured by a printed shadow mask.

14. The security token as claimed in claim 1, further comprising:
a backchannel implemented by a program element and configured to communicate with a host system such that the security token may use a display of the host system as a virtual display.

15. The security token of claim 1, wherein an external electromagnetic field provides power to the security token.

16. The security token as claimed in claim 15, wherein the security token is configured to receive power for operating the tactile sensing user interface, the decoding unit, and the comparison unit from the external electromagnetic field.

17. The security token as claimed in claim 15, further comprising:
a radio frequency identification (RFID) interface that is configured to enable communication with RFID devices and NFC-enabled devices and receive power from the external electromagnetic field generated by said RFID devices or NFC-enabled devices.

18. The security token as claimed in claim 15, further comprising:
a power unit that is configured to power the security token from the external electromagnetic field, wherein the power unit comprises one or more super capacitors configured to buffer energy and said one or more super capacitors consist of electrochemical double-layer capacitors.

19. The security token as claimed in claim 1, further comprising:
a tapped antenna structure or an antenna with at most three turns in order to maximize efficiency of power coupling to the security token.

20. The security token as claimed in claim 1, further comprising:
an optical communication interface which is configured to establish a secure backchannel, wherein the optical communication interface is embedded into a body of the security token.

21. The security token as claimed in claim 1, wherein the surface of the security token is overlaid by the tactile sensing user interface such that tactile patterns entered by the user are sensed through said surface.

22. The security token as claimed in claim 1, wherein the tactile sensing user interface comprises:
a key-pad layout.

23. The security token as claimed in claim 1, wherein the security token is either an electronic identification card or an electronic passport.

24. The security token as claimed in claim 1, the security token having a portrait format.

25. An authentication system comprising an authentication server and the security token as claimed in claim 1, wherein the security token is further configured to send a verification result to the authentication server.

* * * * *